(12) United States Patent
Sadhwani et al.

(10) Patent No.: US 11,450,303 B2
(45) Date of Patent: Sep. 20, 2022

(54) UNMANNED AERIAL VEHICLE (UAV) BASED NOISE CANCELLATION IN PHYSICAL AREA

(71) Applicant: SONY CORPORATION, Tokyo (JP)

(72) Inventors: Hemant Sadhwani, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 427 days.

(21) Appl. No.: 16/680,952

(22) Filed: Nov. 12, 2019

(65) Prior Publication Data
US 2021/0142776 A1    May 13, 2021

(51) Int. Cl.
| | |
|---|---|
| *G10K 11/178* | (2006.01) |
| *H04N 7/18* | (2006.01) |
| *G06T 7/60* | (2017.01) |
| *H04N 5/247* | (2006.01) |
| *G10L 25/51* | (2013.01) |
| *G05D 1/10* | (2006.01) |
| *B64C 39/02* | (2006.01) |
| *G05B 13/02* | (2006.01) |

(Continued)

(52) U.S. Cl.
CPC ...... *G10K 11/17823* (2018.01); *B64C 39/024* (2013.01); *G05B 13/0265* (2013.01); *G05D 1/104* (2013.01); *G06T 7/60* (2013.01); *G06V 20/00* (2022.01); *G06V 40/103* (2022.01); *G10K 11/17873* (2018.01); *G10L 25/51* (2013.01); *H04N 5/247* (2013.01); *H04N 7/181* (2013.01); *H04N 7/188* (2013.01); *B64C 2201/12* (2013.01); *G06T 2207/30196* (2013.01); *G06T 2207/30242* (2013.01); *G10K 2210/1281* (2013.01); *G10K 2210/3044* (2013.01)

(58) Field of Classification Search
None
See application file for complete search history.

(56) References Cited

U.S. PATENT DOCUMENTS

| | | | |
|---|---|---|---|
| 9,889,931 B2 | 2/2018 | Xu et al. | |
| 2007/0223714 A1 * | 9/2007 | Nishikawa | G10K 11/17857 381/71.1 |

(Continued)

FOREIGN PATENT DOCUMENTS

| | | | |
|---|---|---|---|
| CN | 206179506 U | 5/2017 | |
| CN | 113261310 A * | 8/2021 | G06F 3/165 |

*Primary Examiner* — Heather R Jones
(74) *Attorney, Agent, or Firm* — Chip Law Group

(57) ABSTRACT

A control apparatus and method for noise cancellation in a physical area. The control apparatus receives a trigger input which includes information about a first physical area and further controls an image capturing device to capture at least one first image of the first physical area based on the received trigger input. The control apparatus further determines a number of occupants of a first set of occupants present in the first physical area and scene information corresponding to the first physical area based on the captured at least one first image. The control apparatus further controls a movement of a first plurality of unmanned aerial vehicles (UAVs) in a physical three-dimensional (3D) space to create a virtual noise cancellation boundary around the first physical area based on the determined number of occupants of the first set of occupants and the scene information.

21 Claims, 10 Drawing Sheets

(51) Int. Cl.
*G06V 20/00* (2022.01)
*G06V 40/10* (2022.01)

(56) References Cited

U.S. PATENT DOCUMENTS

| | | | | |
|---|---|---|---|---|
| 2011/0274283 | A1* | 11/2011 | Athanas | G10K 11/17873 |
| | | | | 381/71.7 |
| 2012/0237049 | A1* | 9/2012 | Brown | G10K 11/17885 |
| | | | | 381/71.1 |
| 2016/0063987 | A1* | 3/2016 | Xu | H04R 1/1083 |
| | | | | 381/71.14 |
| 2021/0217398 | A1* | 7/2021 | Gunaseela Boopathy | |
| | | | | G10K 11/17857 |

* cited by examiner

UNMANNED AERIAL VEHICLE (UAV) BASED NOISE CANCELLATION IN PHYSICAL AREA

CROSS-REFERENCE TO RELATED APPLICATIONS/INCORPORATION BY REFERENCE

None.

FIELD

Various embodiments of the disclosure relate to noise cancellation. More specifically, various embodiments of the disclosure relate to an unmanned aerial vehicle (UAV) based noise cancellation in a physical area.

BACKGROUND

Many techniques have been developed to provide soundproof environment in different physical spaces (for example offices, residential areas). Typically, rooms are surrounded with a fixed infrastructure (for example walls made of a particular material) to provide the soundproof environment for occupants of the room. In certain situations, different noise cancellation techniques have been developed with the fixed infrastructures to enhance the soundproofing capability around the room. With the increase in the number of people in a particular physical space (such as office), a limited number of fixed infrastructure rooms may not fulfil the requirement of certain people to achieve soundproof conversations. In certain situations of open areas (for example, restaurants, party places, parks, etc), it may be difficult to get the soundproof fixed infrastructure instantly to initiate a verbal communication (such as telephonic call, a conversation with nearby person). Further, the verbal communication or sound reproduction performed in the open areas may create a disturbance or nuisance for neighboring people. Thus, an advanced and intelligent system may be required which may provide a soundproofing solution on a real-time basis.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A control apparatus and a method for noise cancellation in physical area based on unmanned aerial vehicle (UAV) is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
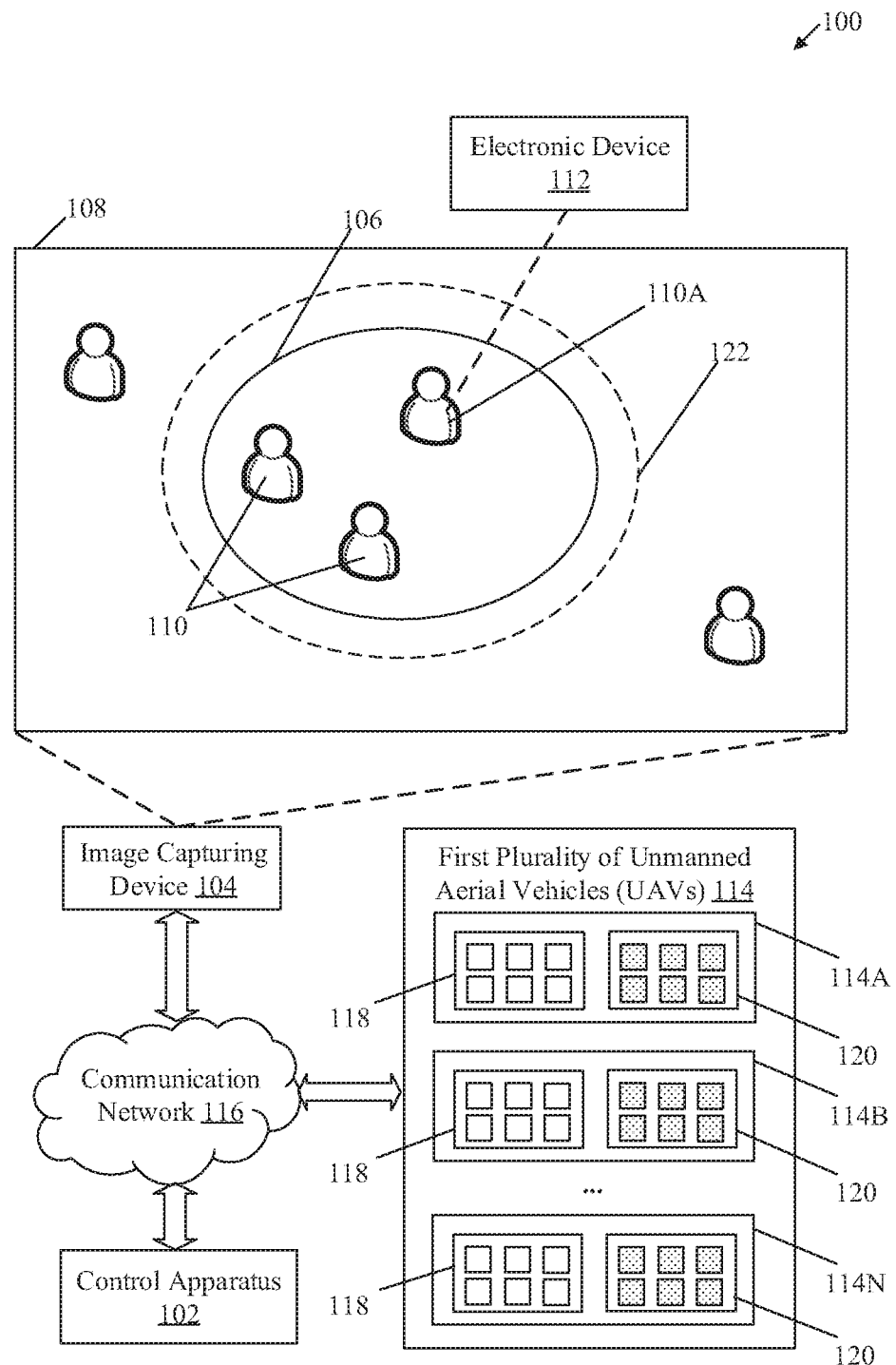
FIG. 1 is a block diagram that illustrates an exemplary network environment for noise cancellation in physical area based on unmanned aerial vehicle (UAV), in accordance with an embodiment of the disclosure.

The following described implementations may be found in a control apparatus and a method for to provide a soundproof environment on a real-time basis in a physical area based on an unmanned aerial vehicles (UAV). Exemplary aspects of the disclosure provide a control apparatus that may be configured control an image capturing device (for example a camera) to capture at least one first image of the first physical area (for example an indoor or outdoor area). The control apparatus may further determine a number of occupants (for example number of people) present in the first physical area from the captured image. The control apparatus may further determine scene information of the first physical area based on the captured image. The scene information may indicate whether the first physical area may be an indoor area (for example an office, a home, a restaurant, or the like) or an outdoor area (for example a playground, a terrace, or the like). The control apparatus may further determine a plurality of unmanned aerial vehicles (UAV), such as flying drones, based on the determined number of occupants present in the first physical area and the scene information corresponding to the first physical area. The control apparatus may further control the movement (in a physical three-dimension space) of the plurality of UAVs to create a virtual noise cancellation boundary around the first physical area.

Each of the plurality of UAVs, which surround the first physical area, may include a plurality of audio capturing devices (for example microphone) and a plurality of sound rendering devices (for example a speaker). The plurality of audio capturing devices and the plurality of sound rendering devices in each of the plurality of UAVs may create a virtual noise cancellation boundary around the first physical area such that noise associated with outside of the first physical area may be prevented to enter inside the first physical area. The occupants present inside the first physical area may be undisturbed from the outside noise. Thus, the created virtual noise cancellation boundary may provide a soundproof environment in the first physical area without utilization of fixed infrastructures (such meeting rooms with fixed walls). Similarly, based on the virtual noise cancellation boundary created by the plurality of UAVs, the noise or sound associated with inside the first physical area may be prevented to move outside the first physical area. In accordance with an embodiment, the disclosed control apparatus may create the virtual noise cancellation boundary based on a request (i.e. trigger input) received from an electronic device (such as mobile phone) associated with an occupant present in the first physical area. The disclosed control apparatus may also initiate the control of the plurality of UAVs to create the virtual noise cancellation boundary based on the trigger input received from the image capturing device (for example the image capturing device detects a situation of a meeting on real-time basis). Thus, the control apparatus may dynamically monitor the first physical area, determine the number of occupants on the real-time basis, and accordingly provide soundproof (or noise-free) environment to the occupants inside or outside the first physical area based on dynamic control of the movement of the plurality of UAVs around the first physical area.

FIG. 1 is a block diagram that illustrates an exemplary network environment for noise cancellation in physical area based on unmanned aerial vehicle (UAV), in accordance with an embodiment of the disclosure. With reference to FIG. 1, there is shown a network environment 100. The network environment 100 may include a control apparatus 102, an image capturing device 104, a first plurality of unmanned aerial vehicles (UAVs) 114, and a communication network 116. In the network environment 100, there is further shown a first physical area 106. Example of the first physical area 106 may include, but are not limited to, an area in an indoor room or an outdoor area. The first physical area 106 may be included in a second physical area 108 (for example a room, an office area, a restaurant area, a playground, a terrace of a building, an enclosed space, an open space, or the combination). As shown in FIG. 1, the first physical area 106 may be a part or enclosed in the second physical area 108. The first physical area 106 may be captured by the image capturing device 104.

In FIG. 1, the first physical area 106 may include a first set of occupants 110. The first set of occupants 110 may include people present in the first physical area 106. The first set of occupants 110 may include a first occupant 110A which may be associated with an electronic device 112. There is further shown a first plurality of UAVs 114 which may further include a first UAV 114A, a second UAV 114B, and an $N^{th}$ UAV. Each of the first plurality of UAVs 114 may include a first set of audio capturing devices 118 and a first set of sound rendering devices 120. In FIG. 1, there is further shown a virtual noise cancellation boundary 122 created around the first physical area 106. The control apparatus 102, the image capturing device 104, the electronic device 112, and the first plurality of UAVs 114 may be communicatively coupled to each other, via the communication network 116. In FIG. 1, the control apparatus 102 and the image capturing device 104 are shown as two separate devices; however, in some embodiments, the entire functionality of the image capturing device 104 may be included in the control apparatus 102, without a deviation from scope of the disclosure.

The control apparatus 102 may include suitable logic, circuitry, interfaces and/or code that may be configured to control the image capturing device 104 to capture an image of the first physical area 106 based on a trigger input received from the electronic device 112. The electronic device 112 may be associated with the first occupant 110A of the first set of occupants 110. The control apparatus 102 may be further configured to determine a number of occupants in the first set of occupants 110 present in the first physical area 106 and the scene information (for example indoor area or an outdoor area) corresponding to the first physical area 106 based on the captured image. The control apparatus 102 may be further configured to control the movement of the first plurality of UAVs 114 in a physical three-dimension space (X-axis, Y-axis, Z-axis) of the first physical area 106 to create the virtual noise cancellation boundary 122 around the first physical area 106 based on the determined number of occupants in the first set of occupants 110 and the scene information. Examples of the control apparatus 102 may include, but are not limited to, a computing device, a controller system, a server, a mainframe machine, a computer work-station, a smartphone, a cellular phone, a mobile phone, and/or a consumer electronic (CE) device.

The image capturing device 104 may include suitable logic, circuitry, interfaces, and/or code that may be configured to capture the image of the first physical area 106. The image capturing device 104 may be further configured to receive one or more control instructions from the control apparatus 102 to capture the image of the first physical area 106. The image capturing device 104 may be selected from a plurality of image capturing devices 212 (shown in FIG. 2) by the control apparatus 102 to capture the image of the first physical area 106. The plurality of image capturing devices 212 may be positioned at different places (for example ceiling or roof) of the second physical area 108 to capture the image of the first physical area 106. Examples of the image capturing device 104 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

In some embodiments, the image capturing device 104 may be a 360-degree camera that may be configured to capture a 360-degree view of the first physical area 106 or the second physical area 108. In accordance with an embodiment, the 360-degree camera may further include a plurality of image sensors (not shown) that are configured to capture the 360-degree view of the surroundings of the first physical area 106 or the second physical area 108. Each image sensor of the plurality image sensors may be configured to capture a portion of the 360-degree view of the surroundings. In accordance with an embodiment, the 360-degree camera may be configured to stitch each captured portion of the plurality image sensors to generate the 360-degree view of the surroundings of the first physical area 106 or the second physical area 108. In accordance with an embodiment, the 360-degree camera may be installed or positioned on a roof or ceiling of the second physical area 108. Examples of the 360-degree camera may include, but are not limited to, an omnidirectional camera, a panoramic camera, and/or other image capturing or devices with 360-degree view capturing capability.

The electronic device 112 may include suitable logic, circuitry, interfaces, and/or code that may be configured to receive the trigger input from the first occupant 110A of the first plurality of UAVs 114. The trigger input may be provided by the first occupant 110A to create the virtual noise cancellation boundary 122 around the first physical area 106. The electronic device 112 may include an input/output device or unit (not shown), for example touch screen or keypad, to receive the trigger input from the first occupant 110A. In some embodiment, the electronic device 112 may include a software application interface to receive the trigger input from the first occupant 110A. The electronic device 112 may be further configured to transmit the received trigger input to the control apparatus 102 to create the virtual noise cancellation boundary 122 around the first physical area 106. Examples of the electronic device 112 may include, but are not limited to, a smartphone, a cellular phone, a mobile phone, a computing device, a gaming device, a mainframe machine, a computer work-station, and/or a consumer electronic (CE) device.

Each of the first plurality of UAVs 114 may comprise suitable logic, circuitry, and/or interfaces that may be an unmanned aerial vehicle or system, controlled by remote system or capable of autonomous flights. The unmanned aerial vehicle or system may be controlled by a remote pilot at a ground control station (such as the control apparatus 102). The unmanned aerial vehicle or system may also fly autonomously, based on various pre-programmed flight plans or complex dynamic automation systems. In accordance with an embodiment, each of the first plurality of UAVs 114 (for example the first UAV 114A, the second UAV 114B) may be configured to receive one or more control instructions from the control apparatus 102, via the communication network 116. The one or more control instructions may include a 3D position (X-axis, Y-axis, or Z-axis) based on which one or more of the first plurality of UAVs 114 move or fly in a physical 3D space in the second physical area 108 to create the virtual noise cancellation boundary 122 around the first physical area 106. In some embodiments, the one or more control instructions may include tilt or orientation information. The first plurality of UAVs 114 may control their tilt angle, or orientation based on the tilt or orientation information included in the one or more control instructions received from the control apparatus 102. The first plurality of UAVs 114 may control their vertical or horizontal alignment based on the one or more control instructions received from the control apparatus 102 Examples of the first plurality of UAVs 114 may include, but are not limited to, a drone, a smart-plane, or other such aircraft which may be controlled by pre-programmed flight plans and/or automation systems (such as the control apparatus 102). In accordance with a frame type and number of motors, various examples of the first plurality of UAVs 114 may include, but are not limited to, a tricopter with three arms and one motor, a quadcopter with four arms and one motor, a hexacopter with six arms and one motor, a Y6 copter with six arms and six motors, an octocopter with eight arms and one motor, and/or an X8 with eight arms and eight motors.

The communication network 116 may include a communication medium through which the control apparatus 102, the image capturing device 104, the first plurality of UAVs 114, and the electronic device 112 may communicate with each other. The communication network 116 may be one of a wired connection or a wireless connection Examples of the communication network 116 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first set of audio capturing devices 118 may include suitable logic, circuitry, interfaces, and/or code that may be configured to capture an ambient noise or sound present in an environment of the second physical area 108. The first set of audio capturing devices 118 may be further configured to convert the captured ambient noise into an electrical signal which may be further provided to the control apparatus 102. In some embodiments, each of the first set of audio capturing devices 118 may be configured to provide the converted electrical signal to a circuit or a processor (not shown) of each of the first plurality of UAVs 114. The first set of audio capturing devices 118 may be disposed on an outer portion (such as an outer portion 314 shown in FIG. 3A) of each of the first plurality of UAVs 114. In such case, the first set of audio capturing devices 118 may be configured to capture the ambient noise associated with an outside area (such as outside area 306 in FIG. 3A) of the first physical area 106. The outside area may be inside the second physical area 108, but outside the first physical area 106 where the first set of occupants 110 may be present. In another embodiment, the first set of audio capturing devices 118 may be disposed on an inner portion (such as an inner portion 316 shown in FIG. 3A) of each of the first plurality of UAVs 114. In such case, the first set of audio capturing devices 118 may be configured to capture the ambient noise associated with an inside area (such as an inside area 310 in FIG. 3A) of the first physical area 106. The inside area may be inside the first physical area 106 where the first set of occupants 110 may be present. Examples of the first set of audio capturing devices 118 may include, but are not limited to, a recorder, an electret microphone, a dynamic microphone, a carbon microphone, a piezoelectric microphone, a fiber microphone, a (micro-electro-mechanical-systems) MEMS microphone, or other microphones known in the art.

The first set of sound rendering devices 120 include suitable logic, circuitry, interfaces, and/or code that may be configured to playback an audio output or sound. Each of the first set of sound rendering devices 120 may be configured to receive electrical audio signals from the processor/circuitry (not shown) of the corresponding UAV of the first plurality of UAVs 114 and further configured to convert the received electrical audio signal into the audio/sound output. In accordance with an embodiment, each of the first set of sound rendering devices 120 may be disposed at the inner portion of each of the first plurality of UAVs 114. In some embodiments, each of the first set of sound rendering devices 120 may be disposed at the outer portion of each of the first plurality of UAVs 114. Examples of the first set of sound rendering devices 120 may include, but are not limited to, a loudspeaker, a woofer, a sub-woofer, a tweeter, a wireless speaker, a monitor speaker, or other speakers or sound output device.

It may be noted that the first physical area 106 or the second physical area 108 shown in FIG. 1 is presented merely as an example. The present disclosure may be also applicable to other types and structures of the physical areas. A description of other types of physical areas has been omitted from the disclosure for the sake of brevity. Further, the number of first set of audio capturing devices 118 and the first set of sound rendering devices 120 of the first plurality of UAVs 114 shown in FIG. 1 is merely an example. Each of the first plurality of UAVs 114 may include one or more audio capturing devices and the sound rendering devices, without a deviation from scope of the disclosure.

In operation, the first set of occupants 110 may be present in the first physical area 106 which may be inside the second physical area 108 (for example an enclosed room or an outdoor area). The first physical area 106 may be an open area which may not be the enclosed area (like meeting rooms or rooms with fixed walls). The electronic device 112 associated with the first occupant 110A (i.e. one of the occupant from the first set of occupants 110) may receive the trigger input to create the virtual noise cancellation boundary 122 around the first physical area 106. The trigger input may be received from the first occupant 110A who may want to conduct a meeting with other of the first set of occupants 110 or may want to attend an important call (for example in an office or a restaurant).

The control apparatus 102 may be configured to receive the trigger input from the electronic device 112. The trigger input may include information about the first physical area 106. The information may include, but are not limited to, position/location of the first physical area 106 in the second physical area 108, an identification of a meeting table/workstation in the second physical area 108, or position/location of the first occupant 110A or the first set of occupants 110 present inside the first physical area 106. The details of the first physical area 106 are described, for example, in FIG. 3A.

The control apparatus 102 may be further configured to control the image capturing device 104 to capture at least one first image of the first physical area 106 based on the received trigger input. The control apparatus 102 may be further configured to determine the number of occupants of the first set of occupants 110 (i.e. who may be present in the first physical area 106) from the captured first image. The details of the determination of the number of occupants from the captured first image is described, for example, in FIG. 3A. The control apparatus 102 may be further configured to determine the scene information corresponding to the first physical area 106 based on the captured first image. The scene information may indicate whether the first physical area 106 area may be an indoor area or an outdoor area. The details of the determination of the scene information based on the captured image is described, for example, in FIG. 3A. In some embodiments, the scene information may be included in the received trigger input. In such case, the control apparatus 102 may be configured to extract the scene information from the received trigger input.

The control apparatus 102 may be further configured to determine a number of unmanned aerial vehicles (UAV) required from the first plurality of UAVs 114 based on the determined number of occupants and the scene information, to create the virtual noise cancellation boundary 122 around the first physical area 106. The control apparatus 102 may be further configured to control the movement of a set of UAVs of the first plurality of UAVs 114 based on the determined number of UAVs. The control apparatus 102 may control the movement of the set of the UAVs in the physical 3D space of the second physical area 108 to create the virtual noise cancellation boundary 122 around the first physical area 106. The set of the UAVs of the first plurality of UAVs 114 may include the first set of audio capturing devices 118 and the first set of sound rendering devices 120 to create the virtual noise cancellation boundary 122 around the first physical area 106. The process of creation of the virtual noise cancellation boundary 122 is described, for example, in FIG. 3A. Thus, the control apparatus 102 may dynamically control the movement of the first plurality of UAVs 114 to create a virtual noise cancellation shield around the first physical area 106 such that the first set of occupants 110 (in different situations such as, but not limited to, meetings, telephonic calls, party) may not be disturbed from the noise associated with an outside area of the first physical area 106. The disclosed control apparatus 102 may dynamically determine the number of UAVs to create the virtual noise cancellation boundary 122 (or soundproof environment) based on real-time measurement of different factors (such as number of the occupants present in the first physical area 106, the scene information (indoor or outdoor) of the first physical area 106, and/or context. The detail of the context is described, for example, in FIG. 3A. Based on the creation of the virtual noise cancellation boundary 122 around the first physical area 106, the disclosed control apparatus 102 may provide a virtual or temporary soundproofed infrastructure to the first set of occupants 110 to conduct required verbal conversations or sound reproductions on the real-time basis. Thus, human effort to search or pre-book fixed meeting rooms may be avoided.

Figure 2:
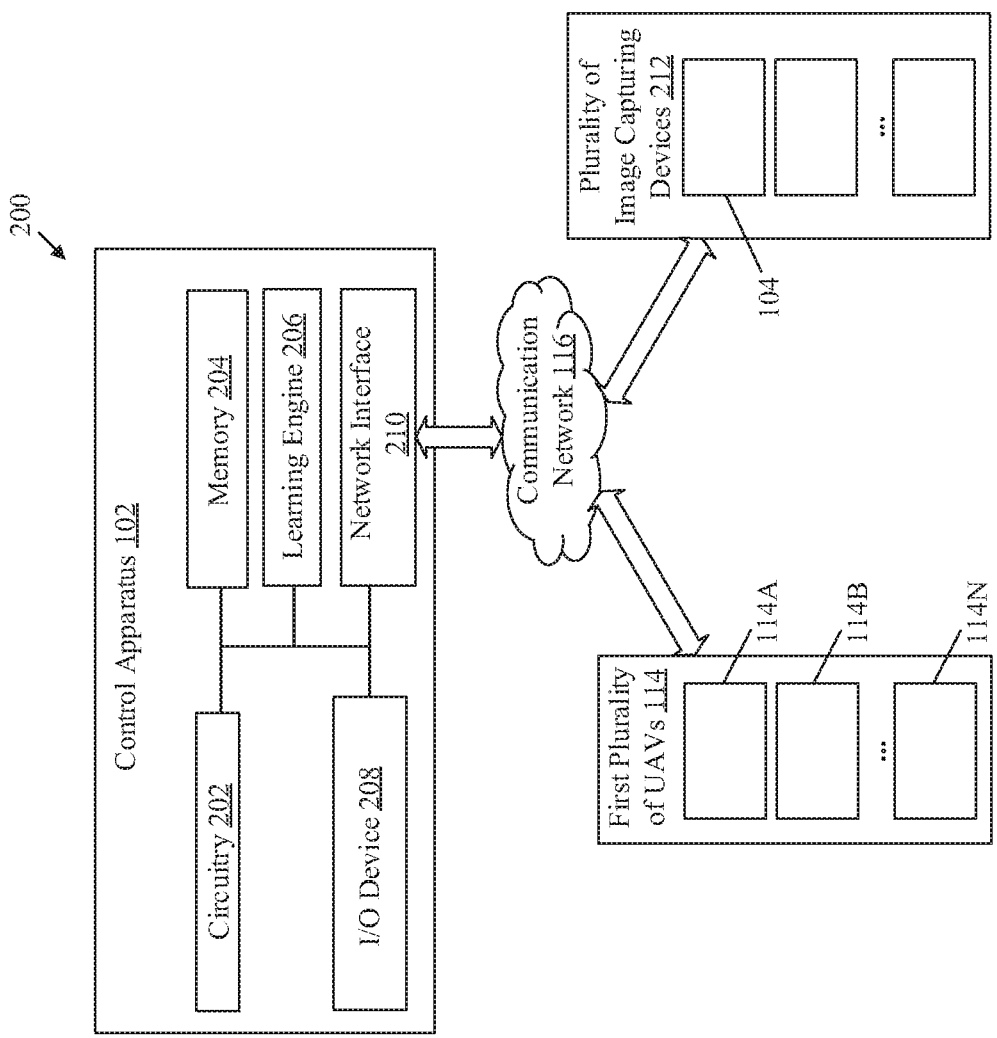
FIG. 2 is a block diagram that illustrates an exemplary control apparatus for noise cancellation in physical area based on unmanned aerial vehicle (UAV), in accordance with an embodiment of the disclosure.

FIG. 2 is a block diagram that illustrates an exemplary control apparatus for noise cancellation in physical area based on unmanned aerial vehicle (UAV), in accordance with an embodiment of the disclosure. FIG. 2 is explained in conjunction with elements from FIG. 1. With reference to FIG. 2, there is shown a block diagram 200 of the control apparatus 102 may include circuitry 202, a memory 204, and a learning engine 206. The control apparatus 102 may further include an input/output (I/O) device 208, and a network interface 210. The circuitry 202 may be communicatively coupled to the memory 204, the I/O device 208, and the network interface 210. In FIG. 2, there is further shown the first plurality of UAVs 114 and a plurality of image capturing devices 212. The plurality of image capturing devices 212 may include the image capturing device 104 which is described in FIG. 1. The first plurality of UAVs 114 and the plurality of image capturing devices 212 may be communicatively coupled to the circuitry 202, via the communication network 116 and the network interface 210.

The circuitry 202 may comprise suitable logic, circuitry, interfaces, and/or code that may be configured to execute instructions stored in the memory 204. The executed instructions may correspond to at least a set of control operations which may include, but not limited to, reception of the trigger input, control of the image capturing device 104 to capture the image of the first physical area 106 or the second physical area 108, determination of the number of occupants in the first set of occupants 110 and the scene information, and the control of the first plurality of UAVs 114 to create the virtual noise cancellation boundary 122. The circuitry 202 may be implemented based on processor technologies known in the art. Examples of the circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may comprise suitable logic, circuitry, interfaces, and/or code that may be configured to store the instructions to be executed by the circuitry 202. Also, the memory 204 may be configured to store the capture image of the first physical area 106 or the second physical area 108. The memory 204 may be further configured to store the determine number of occupants based on which the movement of the first plurality of UAVs 114 may be controlled to create the virtual noise cancellation boundary 122. The memory 204 may be further configured to store information about the selected UAVs of the first plurality of UAVs 114. In some embodiments, the memory 204 may be configured to store current position (XYZ) of each of the first plurality of UAVs 114 being moved to create the virtual noise cancellation boundary 122. The memory 204 may be further configured to store different factors (for example size of the first physical area 106, the context of meeting in the first physical area 106, one or more recognized occupants, source of ambient noise/sound, or a level of noise/sound) based on which the number of UAVs may be determined to create the virtual noise cancellation boundary 122 or the noise shield around the first physical area 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

In some embodiments, the circuitry 202 may be configured to control the learning engine 206 to learn the number of UAVs in the first plurality of UAVs 114, a physical 3D position, and orientation of each of the first plurality of UAVs 114 required to create the virtual noise cancellation boundary 122. The learning engine 206 may be configured to learn and store the number of UAVs, the physical 3D position, and the orientation of each of the first plurality of UAVs 114 based on various factors (such as at least one of recognized source of the noise outside or inside the first physical area 106, the level of the measured noise, the determined number of occupants determined in the first physical area 106, the determined scene information (indoor or outdoor) of the first physical area 106, and/or the context of meeting in the first physical area 106. The learning engine 206 may be configured to learn based on past computations of the circuitry 202 to determine the number of UAVs, the physical 3D position, and the orientation based on various factors. In some embodiments, the circuitry 202 may be configured to retrieve the learned or stored the number of UAVs, the physical 3D position, and the orientation from the learning engine 206 based on real-time change in various factors. In an embodiment, the learning engine 206 may be a neural network or a machine learning network which may be configured to learn the number of UAVs, the physical 3D position, and the orientation of each of the first plurality of UAVs 114 based on various factors which may act as a training dataset to get a trained neural network. The trained neural network may be utilized by the circuitry 202 to identify the number of UAVs, the physical 3D position, and the orientation of each of the first plurality of UAVs 114 based on the real-time determination of various factors. Examples the neural network may include, but are not limited to, a deep neural network (DNN), a convolutional neural network (CNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some embodiments, the learning engine 206 may include numerical computation techniques using data flow graphs.

The I/O device 208 may comprise suitable logic, circuitry, interfaces, and/or code that may be configured to act as an I/O channel/interface between a user and the control apparatus 102. The I/O device 208 may comprise various input and output devices, which may be configured to communicate with different operational components of the control apparatus 102. Examples of the I/O device 208 may include, but are not limited to, a touch screen, a keyboard, a mouse, a joystick, a microphone, and a display screen.

The network interface 210 may comprise suitable logic, circuitry, interfaces, and/or code that may be configured to facilitate communication between the control apparatus 102, the first plurality of UAVs 114, and the plurality of image capturing devices 212, via the communication network 116. The network interface 210 may be implemented by use of various known technologies to support wired or wireless communication of the control apparatus 102 with the communication network 116. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Figure 3A:
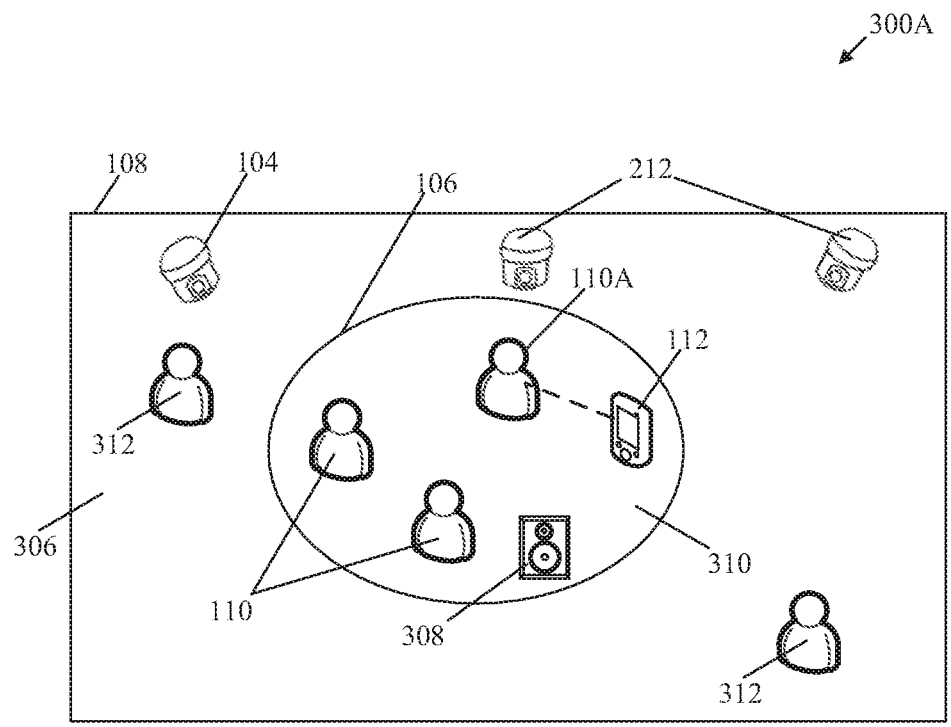
FIGS. 3A, 3B, and 3C, collectively, is a diagram that illustrates first exemplary scenario for noise cancellation in physical area based on unmanned aerial vehicle (UAV), in accordance with an embodiment of the disclosure.
Figure 3A:
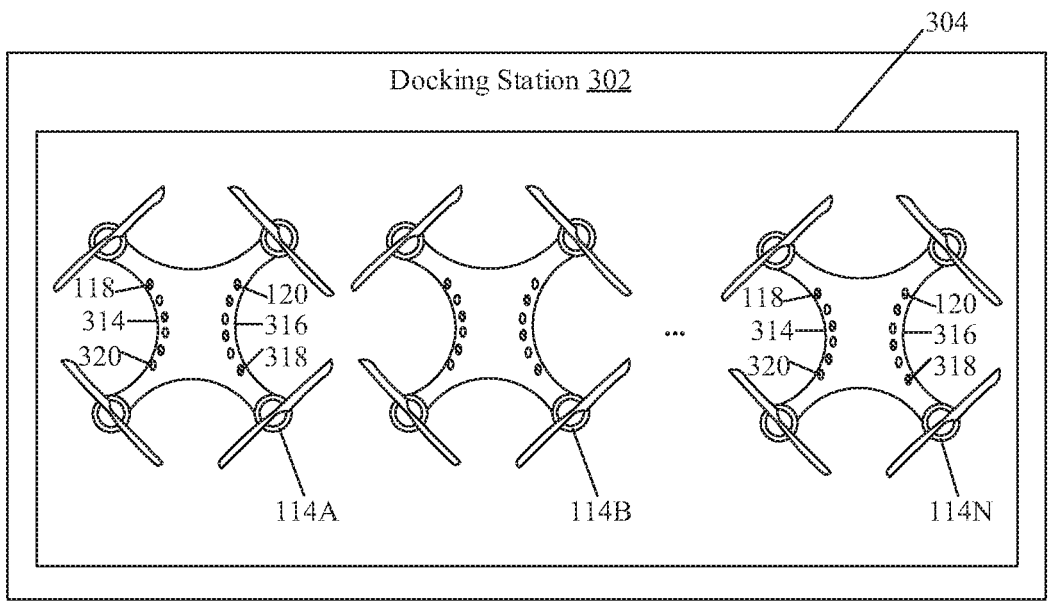
Figure 3B:
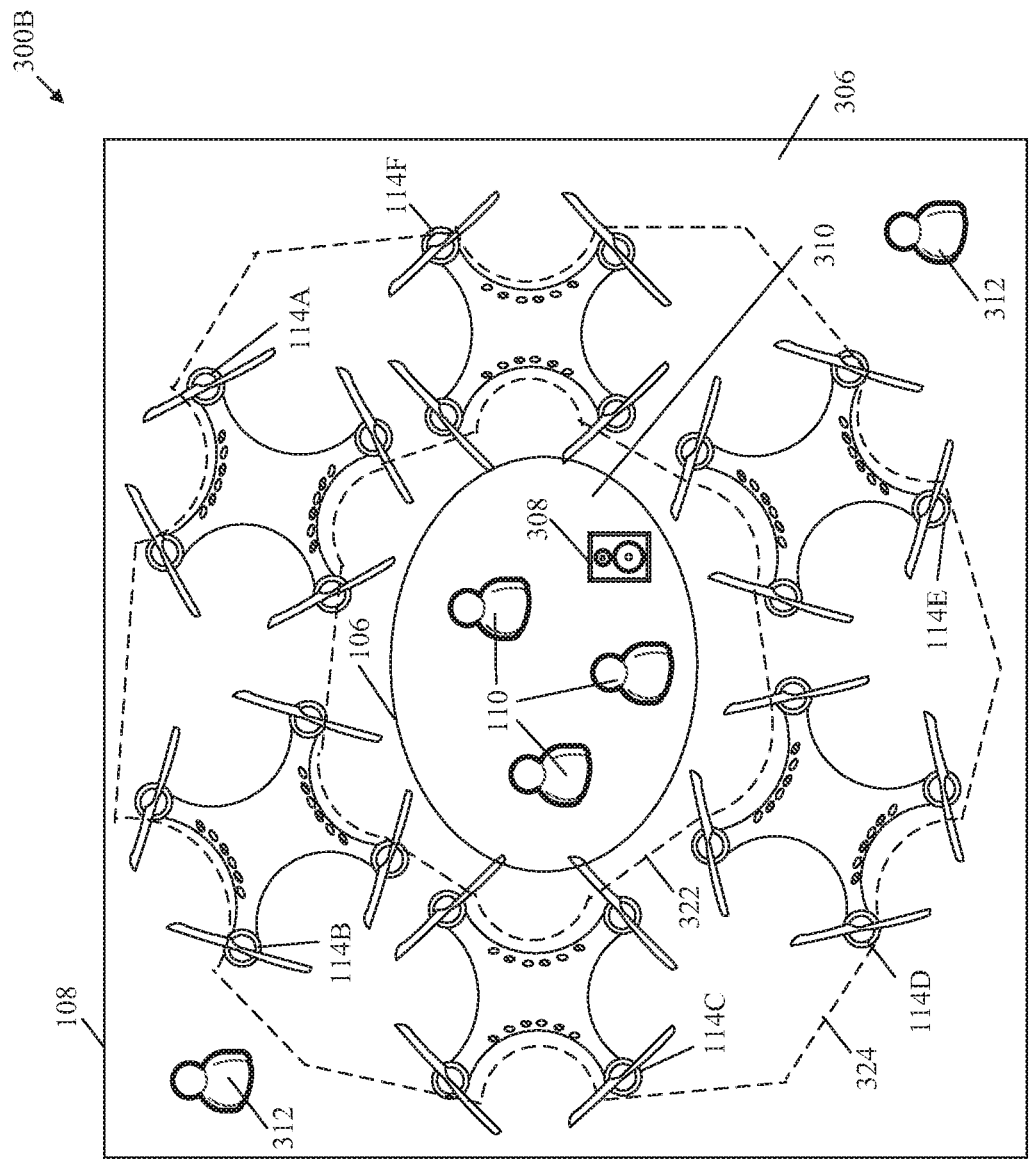
Figure 3C:
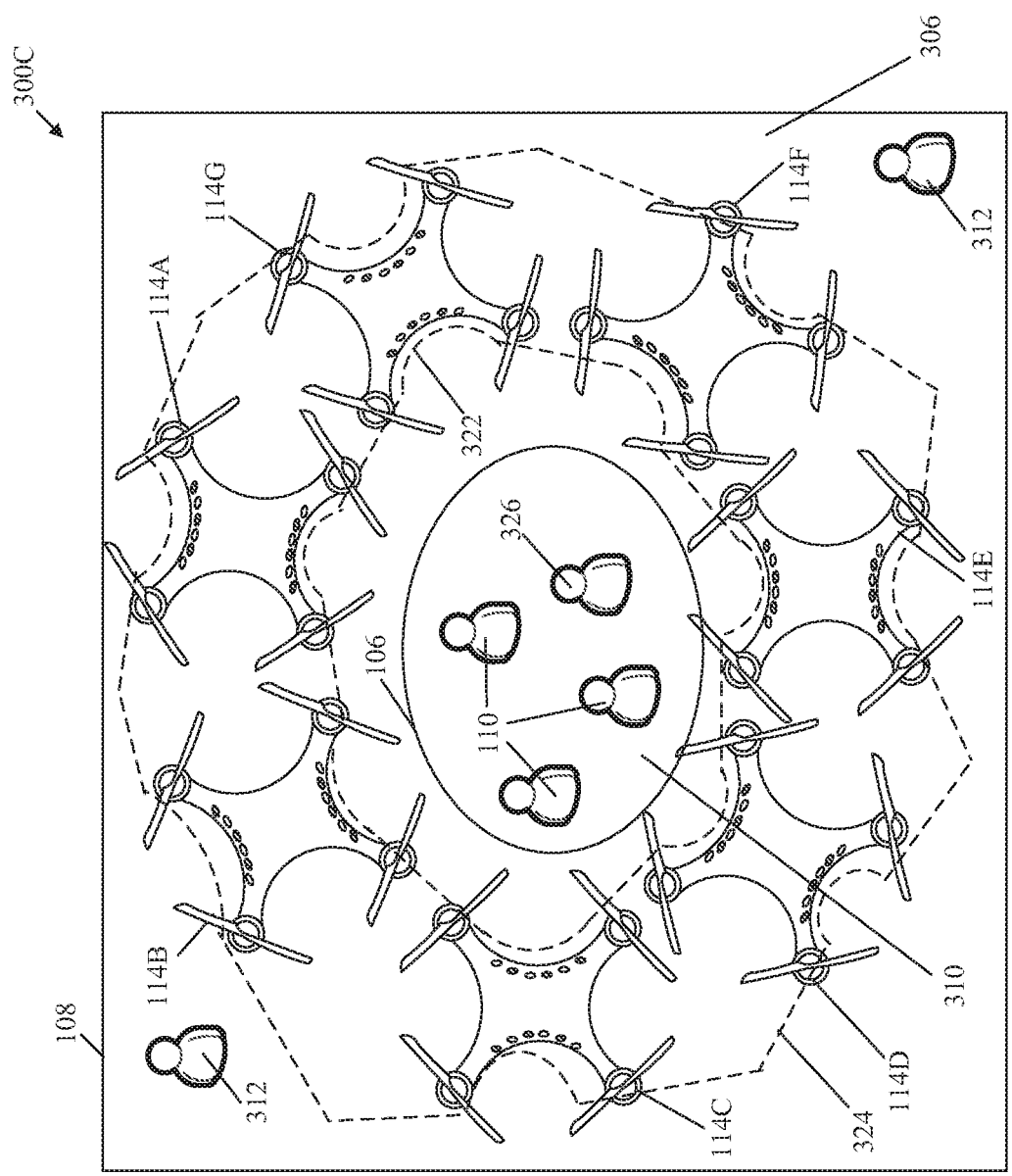

FIGS. 3A, 3B, and 3C, collectively, is a diagram that illustrates exemplary scenario for noise cancellation in physical area based on unmanned aerial vehicle (UAV), in accordance with an embodiment of the disclosure. FIGS. 3A, 3B, and 3C are explained in conjunction with elements from FIG. 1 and FIG. 2. With reference to FIG. 3A, there is shown a first scenario 300A. In the first scenario 300A, there is shown the second physical area 108. The second physical area 108 may be an enclosed area (such as, but not limited to, a room, a hall, a floor, a restaurant, a conference area, or an area enclosed by a number of walls) or an open area (such as, but not limited to, a park, a road, terrace of a building, a balcony, or other open areas without closed walls). The second physical area 108 may include the first physical area 106 where the first physical area 106 may be a portion or a part of the second physical area 108. As shown in FIG. 3A, the first physical area 106 may include the first set of occupants 110. The first set of occupants 110 may be people (such as family members, office colleagues, a set of friends, people associated with a common society, or a set of people of different genders and age groups) which may be physically present inside the first physical area 106.

In the first scenario 300A, there is further shown a docking station 302 which may be included in the second physical area 108. In some embodiments, the docking station 302 may be included in a different area which may be different from the second physical area 108. The docking station 302 may be a defined area or enclosure which may include a plurality of UAVs 304. The first plurality of UAVs 114 may be initially stationed in the docking station 302. The docking station 302 may include a power source (not shown) to power or charge one or more of the plurality of UAVs 304 present in the docking station 302.

In accordance with an embodiment, the first set of occupants 110 may include the first occupant 110A which may carry an electronic device (such as the electronic device 112). The electronic device 112 may be configured to receive a user input from the first occupant 110A. The user input may correspond to a request which may indicate that (for example) the first occupant 110A (or other occupant of the first set of occupants 110) may want to initiate a meeting in the first physical area 106. In another example, the user input may correspond to a request to initiate a telephonic call (audio or video) using the electronic device 112, and the first occupant 110A or the first set of occupants 110 may not wanted to be disturbed from the noise associated with the outside of the first physical area 106. In another example, the user input may correspond to a request that the first occupant 110A or the first set of occupants 110 may want to initiate a conversation which may disturb other people (for example outside occupants 312) present outside the first physical area 106. In another example, the user input may correspond to a request that the first occupant 110A or the first set of occupants 110 may want to start a sound generation device (such as television, speaker, or a gaming device), present inside the first physical area 106, which may disturb other people outside the first physical area 106.

In accordance with an embodiment, the electronic device 112 may be further configured to transmit the received user input to the circuitry 202 of the control apparatus 102. The user input may indicate to the control apparatus 102, that the first occupant 110A or the first set of occupants 110 may want to create a virtual noise shield or a virtual noise cancellation boundary 122 around the first physical area 106 such that the first occupant 110A or the first set of occupants 110 inside the first physical area 106 may not be disturbed from the noise or sound associated with an outside area 306 (i.e. outside of the first physical area 106). In some embodiments, the virtual noise cancellation boundary 122 may be created such that the occupant/people present in the outside area 306 may not be disturbed by the noise/sound created by one or more of the first set of occupants 110 or the sound generation device (such as a speaker 308) present in an inside area 310 which may be inside the first physical area 106.

In accordance with an embodiment, the circuitry 202 may be configured to receive the user input, as the trigger input, from the electronic device 112. The received trigger input may include information about the first physical area 106. In an embodiment, the information may be an exact location or position (for example GPS position) of the first physical area 106 inside the second physical area 108. For example, the information about the first physical area 106 may indicate a table number in a restaurant (i.e. the second physical area 108). In another example, the information about the first physical area 106 may indicate a seat number or work station detail in an office room (i.e. the second physical area 108). In another example, the information may indicate a particular place (such as, but not limited to, a landmark, a point-of-interest, a statue, a fountain, staircase, or a billboard) inside the indoor or the outdoor area (i.e. the second physical area 108).

In the first scenario 300A, there is further shown the plurality of image capturing devices 212 which may include the image capturing device 104 as shown in FIG. 1. The plurality of image capturing devices 212 (for example CCTV or other cameras) may be positioned at different places in the second physical area 108. The plurality of image capturing devices 212 may be configured to capture images of different places in the second physical area 108. In accordance with an embodiment, the circuitry 202 may be configured to select the image capturing device 104 from the plurality of image capturing devices 212 based on the received trigger input which may include the information about the first physical area 106. The circuitry 202 may be configured to select the image capturing device 104 based on locations or field-of-view (FOV) of each of the plurality of image capturing devices 212. For example, based on the information about the first physical area 106, the circuitry 202 may select the image capturing device 104 since the location of the image capturing device 104 may be closest to the location of the first physical area 106 and/or the FOV of the image capturing device 104 may include the first physical area 106.

The circuitry 202 may be further configured to control the selected image capturing device 104 to capture at least one image of the first physical area 106 based on the received information included in the trigger input received from the electronic device 112. In an embodiment, the circuitry 202 may control one or more imaging parameters of the selected image capturing device 104 before the capture of the image of the first physical area 106. The one or more imaging parameters may include, but are not limited to, a zoom, a tilt angle, an orientation, a focus, an exposure, or, a light illumination intensity. In another embodiment, the circuitry 202 may be configured to control one or more lighting devices (not shown) near the first physical area 106. The circuitry 202 may either control the power or intensity of the one or more lighting device near the first physical area 106 to illuminate the first physical area 106. The circuitry 202 may control the imaging parameters and the lighting devices to capture a high-quality or focused image of the first physical area 106.

In accordance with an embodiment, the circuitry 202 may be further configured to detect objects (such as animate object or an inanimate objects) included in the captured image of the first physical area 106. The circuitry 202 may detect the objects included in the captured image of the first physical area 106 based on various object detection techniques known in the art. Thus, the detailed description for the object detection techniques has been omitted from the disclosure for the sake of brevity. The circuitry 202 may be further configured to detect the occupants or persons captured in the image of the first physical area 106. The circuitry 202 may be further configured to determine the number of occupants in the first set of occupants 110 which may be captured in the image. For example, the circuitry 202 may count a number of heads or face of the first set of occupants 110 to determine the number of occupants present in the first physical area 106. In accordance with an embodiment, the circuitry 202 may be further configured to determine the scene information corresponding to the first physical area 106 based on an analysis of the image captured of the selected image capturing device 104. The circuitry 202 may determine whether the first physical area 106 is the indoor area (for example an area inside a room, building, restaurant, conference hall, or other enclosed area) or the outdoor area (for example an area in a park, street, terrace, or other open area) as the scene information. In the analysis of the captured image, the circuitry 202 may detect different objects to determine the scene information as one or more animate or inanimate objects may be different in the indoor or outdoor areas.

In some embodiments, the information included in the trigger input (i.e. received from the electronic device 112) may include the number of occupants of the first set of occupants 110 present in the first physical area 106 or the inside area 310. In some embodiments, the information in the trigger input may include the scene information which may indicate whether the first physical area 106 is the indoor area or the outdoor area. In an embodiment, the electronic device 112 may receive the information from the first occupant 110A and include the information in the user input (or the trigger input). In such case, the circuitry 202 may be configured to extract the number of occupants of the first set of occupants 110 and the scene information from the received trigger input. In another embodiment, the information may include an image of the first occupant 110A who may have provided the user input to the electronic device 112. In another embodiment, the trigger input may include timing information which may indicate a time interval for which the virtual noise cancellation boundary 122 or the virtual noise shield has to be created. The timing information may be received by the electronic device 112 from the first occupant 110A. For example, the timing information may vary from few seconds to certain hours.

In some embodiments, the circuitry 202 may be configured to receive the trigger input, to create the virtual noise cancellation boundary 122, from one of the plurality of image capturing devices 212 placed at different places in the second physical area 108. The circuitry 202 may be configured to control the plurality of image capturing devices 212 to capture a second plurality of images of different places in the second physical area 108 over a period of time or on regular basis. Each of the plurality of image capturing devices 212 may detect the first physical area 106 around which there may be a need to create the virtual noise cancellation boundary 122. For example, the plurality of image capturing devices 212 may determine a context of meeting in the first physical area 106 based on the number of occupants of the first set of occupants 110 present in the first physical area 106 and/or the scene information of the first physical area 106. The context of the meeting may indicate that the first set of occupants 110 may be engaged in a meeting with each other and may require the virtual noise cancellation boundary 122 around the first physical area 106.

In some embodiments, the plurality of image capturing devices 212 may detect one or more objects present in the first physical area 106 to determine the context of meeting. For example, the plurality of image capturing devices 212 may detect the electronic device 112 (as the detected object) through which the first occupant 110A may be engaged in a telephonic call (i.e. audio or video). The plurality of image capturing devices 212 may determine the context of meeting based on the detection of the telephonic call using the electronic device 112 associated with the first occupant 110A. In another example, the plurality of image capturing devices 212 may detect the speaker 308 inside the first physical area 106 as the detected object. The speaker 308 in the inside area 310 may be considered as the origin of sound/noise which may disturb people in the outside area 306. The plurality of image capturing devices 212 may determine the context of meeting (for example as a party) based on the detection of the speaker 308 in the first physical area 106 (for example an area included in a terrace of a building). In an embodiment, the circuitry 202 may be configured to receive the trigger input from one of the plurality of image capturing devices 212 based on the determination of the context of meeting in the first physical area 106. The trigger input received from one (for example the image capturing device 104) of the plurality of image capturing devices 212 may include the information about the first physical area 106.

In some embodiments, the circuitry 202 may be configured to receive the second plurality of images from each of the plurality of image capturing devices 212 and determine the context of meeting based on a detection of objects (for example the electronic device 112 or the speaker 308) included in the received second plurality of images captured over the period of time. The circuitry 202 may be further configured to select the image capturing device 104 from the plurality of image capturing devices 212 based on a set of images received from the image capturing device 104, where the set of images may indicate the context of meeting around the first physical area 106.

In some embodiments, the circuitry 202 may be configured to recognize one or more occupants (present in the second physical area 108 or the first physical area 106) from the second plurality of images captured by the plurality of image capturing devices 212. The circuitry 202 may recognize the one or more occupants based on different face recognition techniques known in the art. The detailed description for the face recognition techniques has been omitted from the disclosure for the sake of brevity. The circuitry 202 102 may be further configured to determine the context of the meeting in the first physical area 106 based on profile information associated with the recognized one or more occupants present in the first physical area 106. For example, in case of recognition of an important person (such as, but not limited to, supervisors of an office, a celebrity, an owner of the second physical area 108, an old-age person, or a person associated with emergency services) captured in the second plurality of images, the circuitry 202 may determine the context of the meeting to initiate the creation of the virtual noise cancellation boundary 122 around the first physical area 106 which may include the important person. For example, in case of the determination that the one or more recognized occupants is a supervisor or a manager (i.e. profile information) of an office project, the circuitry 202 may determine the context of the meeting as a project discussion. In accordance with an embodiment, the circuitry 202 may be configured to retrieve the profile information or samples of face images for the recognition of the one or more occupants from the memory 204.

In accordance with an embodiment, the circuitry 202 may be further configured to determine a number of unmanned aerial vehicles (UAVs) required to create the noise shield or the virtual noise cancellation boundary 122 around the first physical area 106 on the real-time basis based on the determined number of occupants, the scene information, the context of the meeting, and/or the timing information. For example, in case of the outdoor area (as the scene information) and a higher number of occupants present in the first physical area 106, the circuitry 202 may determine a higher number of UAVs to create the noise shield around the first physical area 106 as compared to a scenario where the scene information indicates the indoor area and a lesser number of occupants may be included in the captured image or present in the first physical area 106.

Examples of the required number of UAVs for different number of occupants, the scene information, and the context of the meeting are presented in Table 1, as follows:

TABLE 1

Number of UAVs required to create virtual noise cancellation boundary

| S. No. | Number of Occupants | Scene Information | Context or Type of Meeting | No. of UAVs required to create virtual noise cancellation boundary |
|---|---|---|---|---|
| 1. | 6 | Indoor | Project Discussion | 5 |
| 2. | 15 | Outdoor | Party | 10 |

In some embodiments, the circuitry 202 may be configured to determine a size or an area of the first physical area 106 based the captured images of the first physical area 106. The circuitry 202 may correlate the controlled one or more imaging parameter with the captured image to determine the size or the area of the first physical area 106. In some embodiments, the circuitry 202 may determine standing or seating positions of each of the first set of occupants 110 captured in the image to determine the size or area of the first physical area 106. For example, in case the first set of occupants 110 are standing or seating close to each other, the size of the first physical area 106 may be lower than another case where the first set of occupants 110 are standing or seating apart from each other. In another embodiment, the circuitry 202 may determine the size of the first physical area 106 based on the number of occupants detected in the captured image. For example, in case, with lesser number of occupants, the size of the first physical area 106 (i.e. around with the virtual noise cancellation boundary 122 or the noise shield has to be created) may be lower. In some embodiments, the electronic device 112 may receive the size of the first physical area 106 from the first occupant 110A and include the received size in the trigger input which may be further received by the circuitry 202 of the control apparatus 102. In accordance with an embodiment, the circuitry 202 may determine the number of UAVs required to create the noise shield or the virtual noise cancellation boundary 122 around the first physical area 106 based on the determined number of occupants, the scene information, the context of meeting, and/or the determined size of the first physical area 106.

In accordance with an embodiment, the circuitry 202 may be further configured to select the first plurality of UAVs 114 from the plurality of UAVs 304 (i.e. stationed at the docking station 302) based on the determined number of UAVs required to create the noise shield or the virtual noise cancellation boundary 122. In some embodiments, the circuitry 202 may be configured to select the first plurality of UAVs 114 based on electrical power or energy stored in each of the plurality of UAVs 304. In such case, the circuitry 202 may be configured to request each of the plurality of UAVs 304 to provide power information which may indicate stored power in a battery (such as a battery 726 in FIG. 7) of each of the plurality of UAVs 304. In some embodiments, the memory 204 may store the power information for each of the plurality of UAVs 304. The circuitry 202 may be configured to select the first plurality of UAVs 114 in case the power stored in the battery of each of the first plurality of UAVs 114 may be sufficient enough (or above a defined threshold) to move the corresponding UAV in the physical 3D space and create the virtual noise cancellation boundary 122 (or the noise shield) for the time interval indicated by the timing information of the trigger input.

Figure 5:
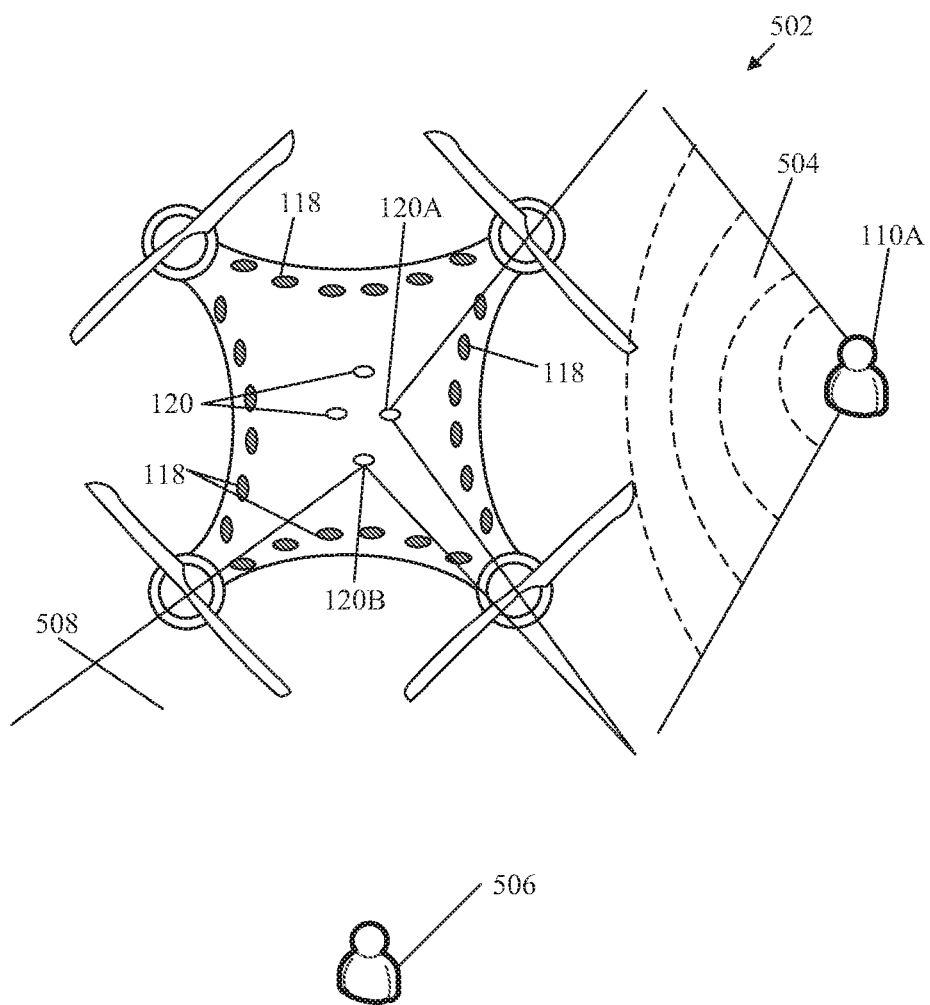
FIG. 5 is a diagram that illustrates an exemplary unmanned aerial vehicle (UAV) for noise cancellation, in accordance with an embodiment of the disclosure.

As shown in FIG. 3A, each of the plurality of UAVs 304 may include the first set of audio capturing devices 118 which may be disposed on an outer portion 314 (i.e. one side) of each of the plurality of UAVs 304. Each of the plurality of UAVs 304 may further include the first set of sound rendering devices 120 which may be disposed on an inner portion 316 (i.e. another side) of each of the plurality of UAVs 304. It may be noted here that the positions of the first set of audio capturing devices 118 and the first set of sound rendering devices 120 shown in FIG. 3A is presented merely as an example. The present disclosure may be also applicable to other positions of the audio capturing devices and the sound rendering devices (as shown in FIG. 5), without deviation from the scope of the disclosure. In accordance with an embodiment, each of the plurality of UAVs 304 may further include a second set of audio capturing devices 318 disposed on the inner portion 316 and include a second set of sound rendering devices 320 disposed on the outer portion 314 of each of the plurality of UAVs 304.

In accordance with an embodiment, the circuitry 202 may be further configured to control the selected first plurality of UAVs 114 to move in the physical 3D space and create the virtual noise cancellation boundary 122 or the noise/sound shield around the first physical area 106. In an embodiment, in case of receipt of the trigger input from one of the plurality of image capturing devices 212, the circuitry 202 may be configured to first send a request to the electronic device 112 (associated with the first occupant 110A) to create the virtual noise cancellation boundary 122 based on the movement of the selected first plurality of UAVs 114. The circuitry 202 may further control the movement of the selected first plurality of UAVs 114 based on receipt of acceptance from the electronic device 112 associated with the first occupant 110A present in the inside area 310 of the first physical area 106.

In accordance with an embodiment, the circuitry 202 may control the flying movement or the flying 3D pattern of the selected first plurality of UAVs 114 such that the first plurality of UAVs 114 may be positioned around the first physical area 106 as shown in a scenario 300B in FIG. 3B. The circuitry 202 may control each of the selected first plurality of UAVs 114 such that all of the first plurality of UAVs 114 may be positioned around the first physical area 106. In accordance with an embodiment, the circuitry 202 may be configured to transmit one or more control instructions to each of the first plurality of UAVs 114 for the movement in the physical 3D space in the second physical area 108. The one or more control instructions may include at least one of X-axis, Y-axis, or Z-axis positions in the physical 3D space for each of the first plurality of UAVs 114. In some embodiments, the circuitry 202 may provide destination information to each of the first plurality of UAVs 114 where the destination information may include set of XYZ positions or patterns/route to reach a specific XYZ position around the first physical area 106. In accordance with an embodiment, the one or more control instructions provided by the circuitry 202 may include orientation information for each of the first plurality of UAVs 114. The orientation information may indicate an orientation or a tilt angle of each of the first plurality of UAVs 114 after positioned around the first physical area 106.

In accordance with an embodiment, each of the selected first plurality of UAVs 114 may be configured to receive the one or more control instructions from the circuitry 202 and further control its movement and the orientation in the physical 3D space. The position of the selected first plurality of UAVs 114 may be controlled around the first physical area 106 based on the one or more control instructions to create the virtual noise cancellation boundary 122 around the first physical area 106 as shown in FIG. 3B. As shown in FIG. 3B, the movement and the orientation of the first plurality of UAVs 114 may be controlled such that an inner virtual boundary 322 and an outer virtual boundary 324 may be formed by the selected first plurality of UAVs 114 around the first physical area 106. In FIG. 3B, there are six number of UAVs of the first plurality of UAVs 114 may be controlled to form the inner virtual boundary 322 and the outer virtual boundary 324. In some embodiments, the virtual noise cancellation boundary 122 may be formed based on at least one of the inner virtual boundary 322 or the outer virtual boundary 324 formed by the selected first plurality of UAVs 114. The first plurality of UAVs 114 may include a first UAV 114A, a second UAV 114B, a third UAV 114C, a fourth UAV 114D, a fifth UAV 114E, and a sixth UAV 114F around the first physical area 106 as shown in FIG. 3B. In accordance with an embodiment, each of the selected first plurality of UAVs 114 may create a portion of virtual perimeter of the virtual noise cancellation boundary 122. The virtual perimeter of noise cancellation may be created for a particular distance (or at a particular angle) by the combination of the first set of audio capturing devices 118, the first set of sound rendering devices 120, the second set of audio capturing devices 318, and the second set of sound rendering devices 320

It may be noted that the six number of UAVs shown in FIG. 3B is merely an example. The first plurality of UAVs 114 may include N number of UAVs determined on a real-time basis based on different aforementioned various factors (such as the number of occupants, the scene information, the context of the meeting, the timing information or the size of the first physical area 106), without a deviation from scope of the disclosure.

With respect to FIG. 3B, the circuitry 202 may be further configured control the first plurality of UAVs 114 to create the virtual noise cancellation boundary 122 (or the inner virtual boundary 322 and the outer virtual boundary 324) based on the control of the first set of audio capturing devices 118, the first set of sound rendering devices 120, the second set of audio capturing devices 318, and the second set of sound rendering devices 320 disposed on each of the first plurality of UAVs 114 positioned around the first physical area 106. In accordance with an embodiment, the circuitry 202 may be further configured to control the first set of audio capturing devices 118 (disposed on the outer portion 314) to capture a first noise (or sound) associated with the outside area 306 (i.e. outside the first physical area 106). The first noise may be produced by different noise or sound sources (for example outside occupants 312) present in the second physical area 108. In some embodiments, the circuitry 202 may control a set of UAVs of the first plurality of UAVs 114 to capture the first noise. For example, the circuitry 202 may control the first set of audio capturing devices 118 of the first UAV 114A, the second UAV 114B, the third UAV 114C, and the fourth UAV 114D (but not the fifth UAV 114E and the sixth UAV 114F) to capture the first noise based on actual source or direction of origin of the first noise in the second physical area 108.

In accordance with an embodiment, the circuitry 202 may be further configured to control a processor or circuitry (such as circuitry 702 shown in FIG. 7) of each of the first plurality of UAVs 114 to receive first electrical signals from the first set of audio capturing devices 118. The received electrical signals may be correspond to the captured first noise. The circuitry 202 may further configured to control the circuitry 702 of each of the first plurality of UAVs 114 to generate a first out-of-phase signal for each of the first electrical signals received from the first set of audio capturing devices 118. The first out-of-phase signals may be 180-degree out of phase (or inverted phase) with the first electrical signals corresponding to the first noise captured by the first set of audio capturing devices 118. In accordance with an embodiment, an amplitude of each of the first out-of-phase signal may be same as an amplitude of the first electrical signal provided by the corresponding audio capturing device of the first set of audio capturing devices 118

In accordance with an embodiment, the circuitry 202 may be further configured to control the circuitry 702 of each of the first plurality of UAVs 114 to provide the generated first out-of-phase signals to the first set of sound rendering devices 120 disposed on the inner portion 316 of the corresponding UAV. In some embodiments, the circuitry 702 of each of the first plurality of UAVs 114 may provide the generated first out-of-phase signal associated with one audio capturing device to the corresponding sound rendering device of the first set of sound rendering devices 120. For example, the first out-of-phase signal corresponding to a noise captured by a first audio capturing device (disposed on the outer portion 314) may be provided to a first sound rendering device (disposed on the inner portion 316) for each of the first plurality of UAVs 114. In accordance with an embodiment, each of the first set of sound rendering devices 120 may be configured to reproduce a first sound wave based on the first out-of-phase signals received from the circuitry 702 of each of the first plurality of UAVs 114.

In an embodiment, each of the first set of sound rendering devices 120 may be oriented in a manner such that the first sound wave may be reproduced inside the first physical area 106. Similarly, each of the first set of audio capturing devices 118 may be oriented in a manner such that the first noise associated with the outside area 306 may be effectively captured by the first set of audio capturing devices 118 of each of the first plurality of UAVs 114. The reproduction of the first sound wave (i.e. out-of-phase of the first noise) towards the inside area 310 of the first physical area 106 may provide a noise cancellation for the first noise which may enter the inside area 310 from the outside area 306. Thus, the combination of the first set of audio capturing devices 118 and the first set of sound rendering devices 120 of the first plurality of UAVs 114 may create the virtual noise cancellation boundary 122 (i.e. inner virtual boundary 322 or outer virtual boundary 324) for the inside area 310 of the first physical area 106 from the first noise associated with the outside area 306. Therefore, the first set of occupants 110 present in the inside area 310 of the first physical area 106 may not be disturbed from the first noise associated with (or originated from) the outside area 306.

With respect to FIG. 3B, each of the selected first plurality of UAVs 114 may include the second set of audio capturing devices 318 disposed at the inner portion 316 and further include the second set of sound rendering devices 320 disposed at the outer portion 314. In accordance with an embodiment, the circuitry 202 may be further configured to control the second set of audio capturing devices 318 and the second set of sound rendering devices 320 of each of the first plurality of UAVs 114 to create the virtual noise cancellation boundary 122 (or the inner virtual boundary 322 and the outer virtual boundary 324) around the first physical area 106. In accordance with an embodiment, the circuitry 202 may be further configured to control the second set of audio capturing devices 318 (disposed on the inner portion 316) to capture a second noise (or sound) associated with the inside area 310 (i.e. inside the first physical area 106). The second noise may be produced by different noise or sound sources (for example the first set of occupants 110 or the speaker 308) present in the first physical area 106.

In accordance with an embodiment, the circuitry 202 may be further configured to control the circuitry 702 (shown in FIG. 7) of each of the first plurality of UAVs 114 to receive second electrical signals from the second set of audio capturing devices 318, where the received second electrical signals may be correspond to the captured second noise. The circuitry 202 may be further configured to control the circuitry 702 of each of the first plurality of UAVs 114 to generate a second out-of-phase signal for each of the second electrical signals received from the second set of audio capturing devices 318. The second out-of-phase signals may be 180-degree out of phase (or inverted phase) with the second electrical signals corresponding to the second noise captured by the second set of audio capturing devices 318. In accordance with an embodiment, an amplitude of each of the second out-of-phase signal may be same as an amplitude of the second electrical signal provided by the corresponding audio capturing device of the second set of audio capturing devices 318.

In accordance with an embodiment, the circuitry 202 may be further configured to control the circuitry 702 of each of the first plurality of UAVs 114 to provide the generated second out-of-phase signals to the second set of sound rendering devices 320 disposed on the outer portion 314 of the corresponding UAV. In some embodiments, the circuitry 702 of each of the first plurality of UAVs 114 may provide the generated second out-of-phase signal associated with one audio capturing device to the corresponding sound rendering device of the second set of sound rendering devices 320. For example, the second out-of-phase signal corresponding to a noise captured by a second audio capturing device (disposed on the inner portion 316) may be provided to a second sound rendering device (disposed on the outer portion 314) for each of the first plurality of UAVs 114. In accordance with an embodiment, each of the second set of sound rendering devices 320 may be configured to reproduce a second sound wave based on the second out-of-phase signals received from the circuitry 702 of each of the first plurality of UAVs 114.

In an embodiment, each of the second set of sound rendering devices 320 may be oriented in a manner such that the second sound wave may be reproduced outside the first physical area 106. Similarly, each of the second set of audio capturing devices 318 may be oriented in a manner such that the second noise associated with the inside area 310 may be effectively captured by the second set of audio capturing devices 318 of each of the first plurality of UAVs 114. The reproduction of the second sound wave (i.e. out-of-phase of the second noise) towards the outside area 306 of the first physical area 106 may provide a noise cancellation for the second noise which may enter the outside area 306 from the inside area 310. Thus, the combination of the second set of audio capturing devices 318 and the second set of sound rendering devices 320 of each of the first plurality of UAVs 114 may create the virtual noise cancellation boundary 122 (i.e. inner virtual boundary 322 or outer virtual boundary 324) for the outside area 306 of the first physical area 106 from the second noise associated with the inside area 310. Therefore, the outside occupants 312 present outside the first physical area 106 may not be disturbed from the second noise associated with the inside area 310 either by the first set of occupants 110 or other sound sources (for example the speaker 308).

In accordance with an embodiment, the circuitry 202 may be further configured to control the image capturing device 104 or the plurality of image capturing devices 212 in the second physical area 108 to capture images of different sound sources of the first noise or the second noise. The circuitry 202 may be further configured to recognize the sound sources to determine a capability of noise/sound generation of the sound sources. For example, the circuitry 202 may recognize that the speaker 308 present inside the first physical area 106 may of a particular manufacture or a particular size and may generate a high-volume noise/sound (in dB) in an operation state. In some embodiments, the circuitry 202 may determine a level or volume of the noise/sound generated by the recognized sound sources. The level or volume of the noise/sound may be monitored based on a plurality of audio capturing devices (for example microphone) deployed at different places in the second physical area 108. The circuitry 202 may be further configured to determine the number of UAVs in the plurality of UAVs 304 to create the virtual noise cancellation boundary 122 around the first physical area 106 based on the recognized sound sources and the determined level of the noise/sound. In some embodiments, the circuitry 202 may determine the 3D position and the orientation of each of the selected first plurality of UAVs 114 based on the recognized sound sources and the determined level of the noise/sound such that an effective noise cancellation shield may be provided around the first physical area 106 irrespective of sound generation capability of different sound sources.

In some embodiments, based on the creation of the virtual noise cancellation boundary 122 (i.e. the inner virtual boundary 322 or the outer virtual boundary 324), the circuitry 202 may continuously detect presence or movement of a second set of occupants 326 (i.e. new occupant different from the first set of occupants 110) in the first physical area 106 as shown in another scenario in FIG. 3C. Based on the detection of the presence of the second set of occupants 326, the circuitry 202 may determine a number of additional UAVs (different from the first plurality of UAVs 114) to create or update the virtual noise cancellation boundary 122 for the first set of occupants 110 and the second set of occupants 326. The circuitry 202 may further select one or more second UAVs (for example a seventh UAV 114G) from the plurality of UAVs 304 stationed in the docking station 302 based on the determined number of additional UAVs. The circuitry 202 may further control the movement of both the first plurality of UAVs 114 and the one or more second UAVs (for example the seventh UAV 114G) in the physical 3D space to create or update the virtual noise cancellation boundary 122 around the first physical area 106 as shown in FIG. 3C. The circuitry 202 may re-adjust the 3D position and the orientation of the first plurality of UAVs 114 to accommodate the one or more second UAVs (the seventh UAV 114G) determined based on the presence of the second set of occupants 326 (i.e. new occupant) in the first physical area 106. In some embodiments, the circuitry 202 may continuously detect the movement of the second set of occupants 326 (or one of the first set of occupants 110) from the inside area 310 to the outside area 306 which may reduce (or change) the number of occupants present in the first physical area 106. In such case, the circuitry 202 may reduce the number of the first plurality of UAVs 114 (and/or the one or more second UAVs) and update the virtual noise cancellation boundary 122 around the first physical area 106. To reduce the number of UAVs, the circuitry 202 may control the one or more second UAVs (for example the seventh UAV 114G) to move back to the docking station 302, and further control (i.e. control of 3D position and/or orientation) the first plurality of UAVs 114 to again create or update the virtual noise cancellation boundary 122 around the first physical area 106. In some embodiments, rather than moving few UAVs to the docking station 302, the circuitry 202 may deactivate one or more UAVs (i.e. the second UAVs or the first plurality of UAVs 114) such that the remaining UAVs continue to create the virtual noise cancellation boundary 122 around the first physical area 106. During the deactivation, the audio capturing devices and the sound rendering devices may be turned-off such that the deactivated UAVs may not contribute in the formation of the virtual noise cancellation boundary 122 around the first physical area 106. The deactivation (or activation) of certain UAVs based on the real-time monitoring of the occupants present in the first physical area 106, may further save power or battery of the UAVs.

In accordance with an embodiment, once the virtual noise cancellation boundary 122 has been created, the circuitry 202 may be further configured to monitor a quality of noise cancellation performed by the first plurality of UAVs 114 around the first physical area 106. For example, once the first noise associated with the outside area 306 has been cancelled to enter the inside area 310 by the virtual noise cancellation boundary 122, the circuitry 202 may continuously monitor the second noise present in the inside area 310. The first noise may be captured by the first set of audio capturing devices 118 disposed at the outer portion 314 and the second noise may be captured by the second set of audio capturing devices 318 disposed at the inner portion 316 of each of the first plurality of UAVs 114. In this example, the second noise may be a noise entered from the outside area 306 after the noise cancellation performed by the virtual noise cancellation boundary 122, but not the noise or sound originated from the first set of occupants 110 present inside the first physical area 106. The circuitry 202 may be configured to determine (through the first set of audio capturing devices 118) the first noise in the outside area 306 and determine (through the second set of audio capturing devices 318) the second noise penetrated into the inside area 310 after the noise cancellation. The circuitry 202 may be further configured to determine the quality of noise cancellation based on the determined first noise and the second noise. In a case, a difference between the first noise and the second noise is below a particular difference threshold or the second noise is above a particular threshold, the circuitry 202 may determine whether the quality of noise cancellation provided by the virtual noise cancellation boundary 122 is acceptable or not. For example, in a case where the penetrated second noise is above the particular threshold (in dB), then the quality of noise cancellation may not be acceptable or good. In such case, the circuitry 202 may determine a number of additional UAV, for example one or more third UAVs (not shown) based on the determined quality of the noise cancellation. The circuitry 202 may further select the one or more third UAVs from the docking station 302 and control the movement (i.e. the 3D position and orientation) of the first plurality of UAVs 114 and the one or more third UAV to update the virtual noise cancellation boundary 122 to further improve the quality of noise cancellation provided between the outside area 306 and the inside area 310. Thus, the disclosed control apparatus 102 may regularly check the quality of the noise cancellation (even after the creation/update of the virtual noise cancellation boundary 122) based on periodic determination of the penetrated second noise (as a feedback) and update the number of UAVs to improve the quality of noise cancellation. In some embodiments, the circuitry 202 may alter the 3D position, the orientation of the first plurality of UAVs 114, or deactivate/activate certain UAVs, to improve the quality of noise cancellation without the addition of additional UAVs. Similarly, at the time of noise cancellation from the inside area 310 to the outside area 306, the circuitry 202 may monitor the first noise penetrated through the virtual noise cancellation boundary 122 from the inside area 310, and further consider the monitored first noise as the feedback to improve or update the virtual noise cancellation boundary 122 created based on the first plurality of UAVs 114 and/or additional UAV.

In accordance with an embodiment, the circuitry 202 may be configured to control the learning engine 206 in the memory 204 to learn the number of UAVs (i.e. the first plurality of UAVs 114) deployed to create the high quality virtual noise cancellation boundary 122 in different situations. The different situations may be based on one of the recognized source of the noise, the level/volume of the noise, the number of occupants in the first set of occupants 110, the scene information (indoor or outdoor), the context of meeting with the first set of occupants 110 as described, for example in FIGS. 1 and 3A. For example, in a case of a new infrastructures (for example a new office, a new restaurant, or a new open area), where the disclosed control apparatus 102 or the plurality of UAVs 304 have been recently established, then the learning engine 206 may learn the number of UAVs, the 3D positions, and/or the orientation of each UAV to create the high-quality noise cancellation shield in different learned situations. The circuitry 202 may be further configured to retrieve the learned number of UAVs (3D positions and the orientation of each UAV) from the trained learning engine 206 based on the detection of different situations which may happen on the real-time basis. The retrieval of the number of UAVs (3D positions and the orientation) from the trained learning engine 206 in the same situations (i.e. which may also occur after learning) may reduce a computational time of the control apparatus 102 to determine the number of UAVs with the use of the trained learning engine 206. At the time of detection of new situations (for example new type of meeting, different number of occupants, new place, or new source), the circuitry 202 may further control the learning engine 206 to learn the number of UAVs (3D position and orientation) determined based on the new situations.

Figure 4:
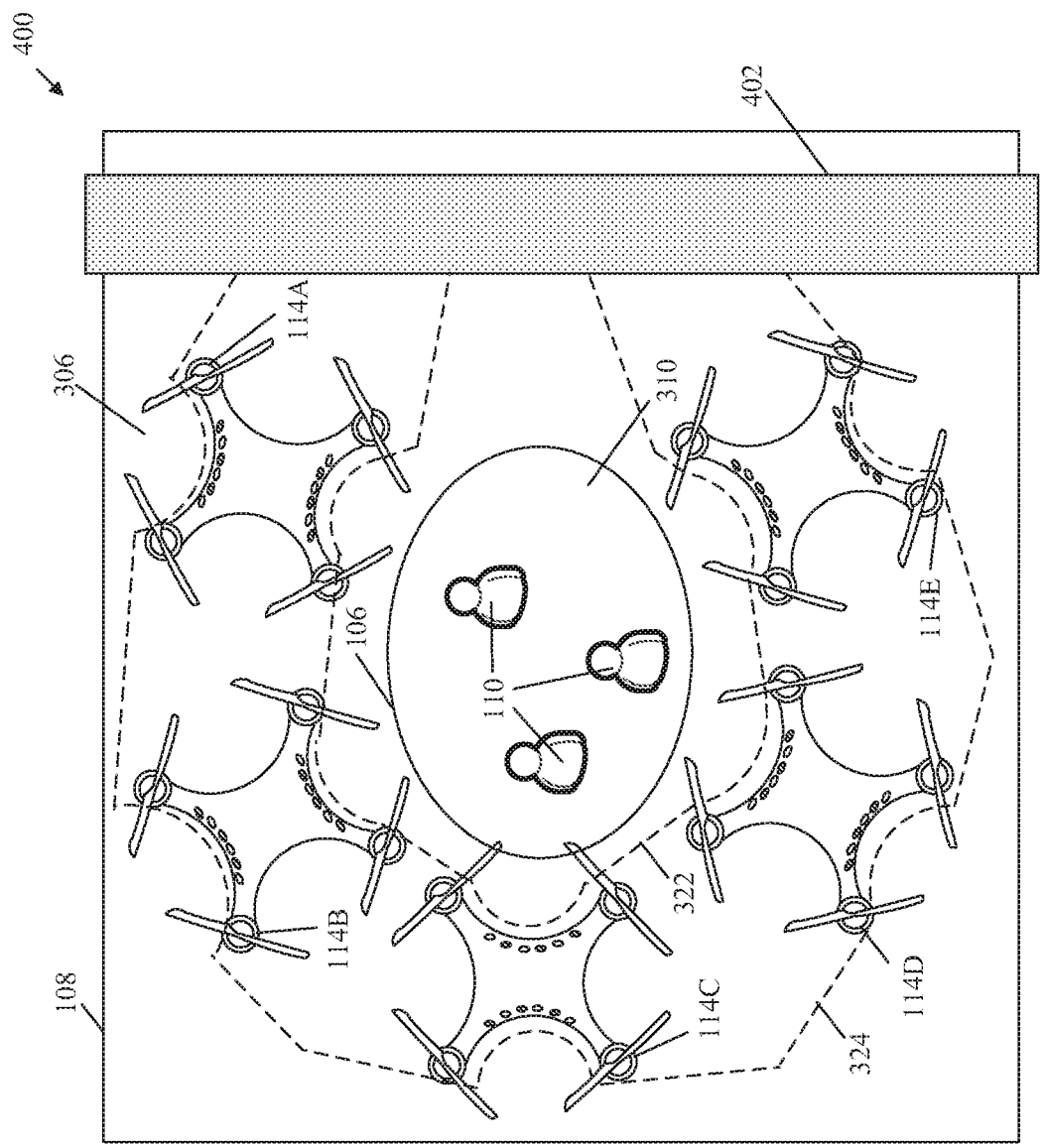
FIG. 4 is a diagram that illustrates a second exemplary scenario for noise cancellation in physical area based on unmanned aerial vehicle (UAV), in accordance with an embodiment of the disclosure.

FIG. 4 is a diagram that illustrates a second exemplary scenario for noise cancellation in physical area based on unmanned aerial vehicle (UAV), in accordance with an embodiment of the disclosure. FIG. 4 is explained in conjunction with elements from FIGS. 1, 2, and 3A-3C. With reference to FIG. 4, there is shown a second scenario 400. In the second scenario 400, there is shown the first set of occupants 110 present in the first physical area 106. There is further shown a wall 402 which may be present near the first physical area 106 around which the virtual noise cancellation boundary 122 has to be created as described, for example, in FIGS. 3A and 3B. There may be one or more walls, like the wall 402, which may be close to the first physical area 106. The wall 402 may cover the first physical area 106 from at least one side. The circuitry 202 may configured to detect the wall 402 in close proximity to the first physical area 106 based on the image captured by the selected image capturing device 104 as described, for example, in FIG. 3A.

The circuitry 202 may be further configured to detect the number of unmanned aerial vehicles (UAVs) required to create the noise shield or the virtual noise cancellation boundary 122 based on the number of occupants present in the first physical area 106 and the detected wall 402 near the first physical area 106. For example, the first physical area 106 may be a corner area of the second physical area 108 (i.e. which includes the first physical area 106) covered by one or more walls (like the wall 402). In such case, the combination of the selected number of UAVs and the wall 402 may create the virtual noise cancellation boundary 122 around the first physical area 106 as shown in FIG. 4. In some embodiments, the circuitry 202 may determine the number of UAVs required to create the virtual noise cancellation boundary 122 (i.e. inner virtual boundary 322 or outer virtual boundary 324) around the first physical area 106 on the real-time basis based on the determined number of occupants, the detected wall 402, the scene information, the context of the meeting, and/or the timing information. As shown in FIG. 4, based on the detection of the wall 402, the number of UAVs required to create the noise shield may be lesser as compared to the number of UAVs used in a situation (without wall) shown in FIG. 3B. For example, in FIG. 4, the five number of the first plurality of UAVs 114 (such as the first UAV 114A, the second UAV 114B, the third UAV 114C, the fourth UAV 114D, and the fifth UAV 114E) may be used to create the virtual noise cancellation boundary 122 around the first physical area 106 near the wall 402.

In accordance with an embodiment, the circuitry 202 may be configured to regularly monitor the movement or positions of the first set of occupants 110 inside the first physical area 106 based on the second plurality of images received from the plurality of image capturing devices 212 (shown in FIG. 3A). For example, based on the detection that the first set of occupants 110 has moved from a first area (for example the first physical area 106 shown in FIG. 3B) to a second area (for example the first physical area 106 shown in FIG. 4A) which may be close to the wall 402, the circuitry 202 may reduce or update the number of UAVs to create or update the virtual noise cancellation boundary 122 around the first physical area 106 near the wall 402. In some embodiments, the circuitry 202 may deactivate the audio capturing devices and the sound rendering devices of few UAVs (for example the sixth UAV 114F of FIG. 3B) to update the virtual noise cancellation boundary 122 near the wall 402 shown in FIG. 4. Thus, based on the detection of the wall 402 and reduction or deactivation of certain UAVs, the disclosed control apparatus 102 may provide power saving. In an embodiment, as described, for example, in FIG. 3C, the circuitry 202 may be further configured to maintain the quality of the noise cancellation (after the creation/update of the virtual noise cancellation boundary 122) from a noise or sound reflected from the wall 402 near the first physical area 106.

FIG. 5 is a diagram that illustrates an exemplary unmanned aerial vehicle (UAV) for noise cancellation, in accordance with an embodiment of the disclosure. FIG. 5 is explained in conjunction with elements from FIGS. 1, 2, 3A-3C, and 4. With reference to FIG. 5, there is shown an exemplary unmanned aerial vehicle (UAV) (such as a UAV 502). The UAV 502 may include a set of audio capturing devices (such as the first set of audio capturing devices 118) disposed (for example) at an outer boundary of the UAV 502 as shown in FIG. 5. The UAV 502 may further include a set of sound rendering devices (such as the first set of sound rendering devices 120) disposed (for example) at a center region of the UAV 502 as shown in FIG. 5. In an example, the UAV 502 may be a part of the first plurality of UAVs 114 selected to create the virtual noise cancellation boundary 122 around the first physical area 106 as shown in FIGS. 3A-3B and 4.

In an accordance with an embodiment, the circuitry 202 of the control apparatus 102 (or the circuitry 702 shown in FIG. 7) may be configured to control the first set of audio capturing devices 118 and the first set of sound rendering devices 120 based on a position of an occupant located close to the UAV 502. For example, as shown in FIG. 5, the circuitry 202 may be configured to control a first sound rendering device 120A of the first set of sound rendering devices 120, to reproduce an out-of-phase sound wave or provide noise cancellation for a first occupant (such as the first occupant 110A) in a first region 504 as shown in FIG. 5. The first occupant 110A may a part of the first physical area 106 for which the noise shield or the virtual noise cancellation boundary 122 has been created.

In some embodiments, the circuitry 202 may be configured to control a second sound rendering device 120B or others of the first set of sound rendering devices 120 to prevent the noise cancellation (or prevent reproduction of the out-of-phase sound wave) for a second occupant 506. In an embodiment, the position of the second occupant 506 may be outside the first physical area 106 (not shown in FIG. 5). Therefore, the UAV 502 may be controlled not to provide the noise cancellation for the second occupant 506 by the control or deactivation of the second sound rendering device 120B. In another example, in case, the circuitry 202 detects (i.e. based on the image captured by the image capturing device 104) that the second occupant 506 was initially in the first physical area 106 (or inside the virtual noise cancellation boundary 122) and has moved out (i.e. in a second region 508 shown in FIG. 5) from the first physical area 106, then the circuitry 202 may deactivate the second sound rendering device 120B to avoid noise cancellation for the second region 508 or the second occupant 506. In another example, the second occupant 506 may be a lesser ranked person (for example lower designation person), as compared to the first occupant 110A, who has just entered in the first physical area 106 or the second region 508. Based on such detection, the circuitry 202 may also be deactivate the second sound rendering device 120B to avoid noise cancellation for the second region 508 or the second occupant 506. Based on the control of the first sound rendering device 120A and/or the second sound rendering device 120B for the first occupant 110A and the second occupant 506 respectively, the circuitry 202 may provide control of the directionality of the noise cancellation of the occupants. In some embodiments, the circuitry 202 may also activate or deactivate one or more of the first set of audio capturing devices 118 to provide or avoid noise cancellation feature for the second region 508 or the second occupant 506. Thus, the disclosed control apparatus 102 may control the UAVs, and internal components (such as audio capturing devices or sound rendering devices) to control the noise cancellation shields based on the occupants and their positions.

Figure 6:
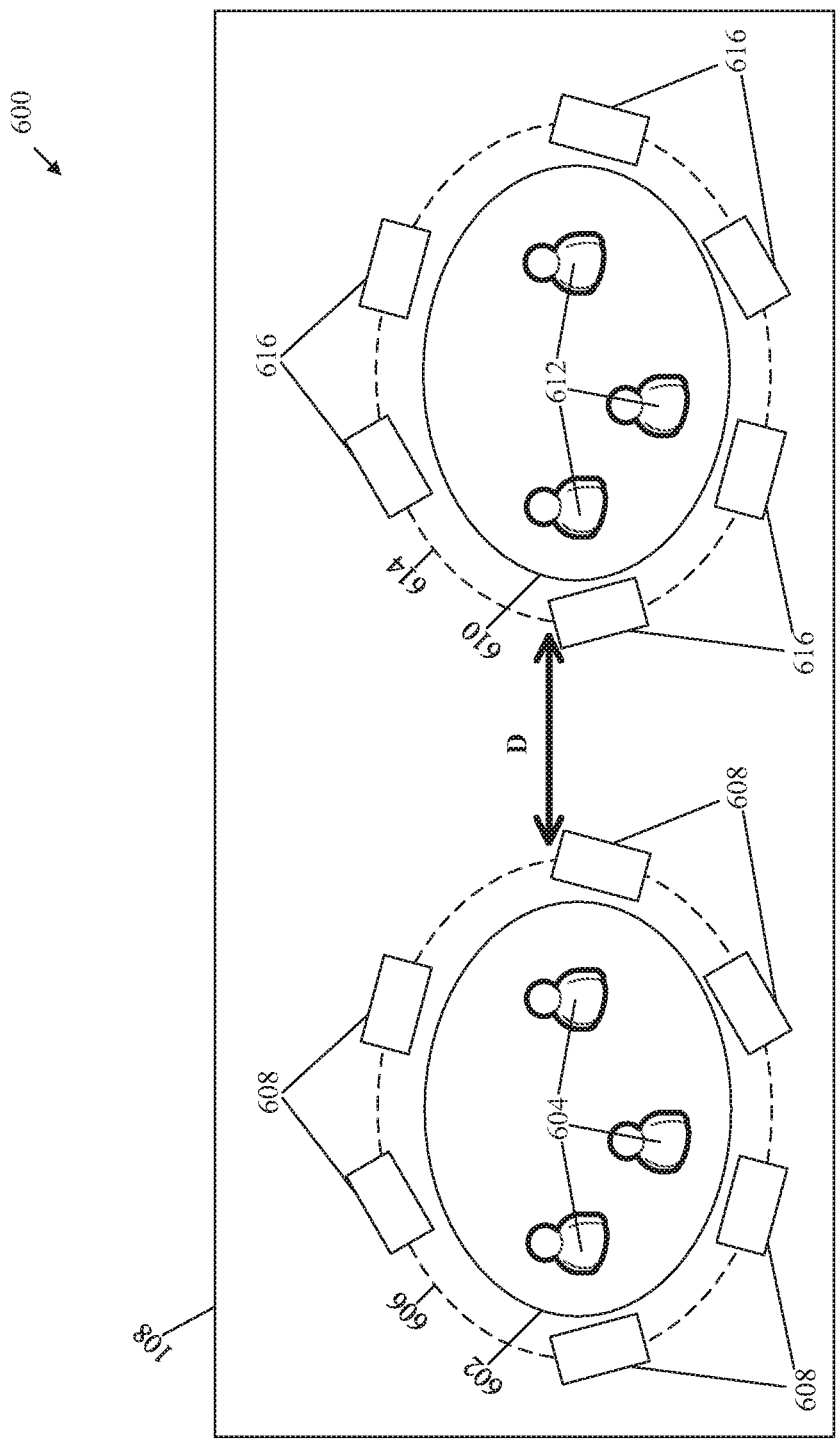
FIG. 6 is a diagram that illustrates a third exemplary scenario for multiple noise cancellation boundaries in a physical area based on unmanned aerial vehicles (UAV), in accordance with an embodiment of the disclosure.

FIG. 6 is a diagram that illustrates a third exemplary scenario for multiple noise cancellation boundaries in a physical area based on unmanned aerial vehicles (UAVs), in accordance with an embodiment of the disclosure. FIG. 6 is explained in conjunction with elements from FIGS. 1, 2, 3A-3C, 4, and 5. With reference to FIG. 6, there is shown a third scenario 600. In the third scenario 600, there is shown a second physical area (such as the second physical area 108 (for example a room). There is further shown a physical area 602 (similar to the first physical area 106 shown in FIGS. 1 and 3A-3C) which may be included in the second physical area 108 and may include a first set of occupants 604 (similar to the first set of occupants 110 in FIGS. 1 and 3A-3C). In FIG. 6, there is further shown a first virtual noise cancellation (NC) boundary 606 which may surround the physical area 602 and create a first virtual room for the first set of occupants 604. The first virtual NC boundary 606 may be similar to the virtual noise cancellation boundary 122 shown in FIG. 1 (or inner virtual boundary 322 or the outer virtual boundary 324 shown in FIGS. 3A-3C). The first virtual room or the first virtual NC boundary 606 may be created based on positions and/or orientations of a first plurality of UAVs 608 (similar to first plurality of UAVs 114) shown in FIG. 6. Each of the first plurality of UAVs 608 may be similar to the UAV 502 (or the first UAV 114A). The first plurality of UAVs 608 may be controlled by the circuitry 202 of the control apparatus 102 to create the first virtual NC boundary 606 for the first set of occupants 604 present in the physical area 602 as described, for example, in FIG. 3A-3C.

In FIG. 6, there is further shown another physical area 610 (similar to the first physical area 106 shown in FIGS. 1 and 3A-3C) inside the second physical area 108. The other physical area 610 may include a second set of occupants 612 (different from the first set of occupants 604). There is further shown a second virtual noise cancellation (NC) boundary 614 which may surround the other physical area 610 and create a second virtual room for the second set of occupants 612. The second virtual NC boundary 614 may be similar to the virtual noise cancellation boundary 122 shown in FIG. 1 (or inner virtual boundary 322 or the outer virtual boundary 324 shown in FIGS. 3A-3C). The second virtual room or the second virtual NC boundary 614 may be created based on positions and/or orientations of a second plurality of UAVs 616 (as shown in FIG. 6) which may be different from the first plurality of UAVs 608. Each of the second plurality of UAVs 616 may be similar to the UAV 502 (or the first UAV 114A). The second plurality of UAVs 616 may be controlled by the circuitry 202 of the control apparatus 102 to create the second virtual NC boundary 614 for the second set of occupants 612 present in the other physical area 610 as described, for example, in FIG. 3A-3C.

As shown in FIG. 6, both the first virtual room and the second virtual room created for the first set of occupants 604 and the second set of occupants 612 may be adjacent to each other in the second physical area 108. In detection of such situation, the circuitry 202 of the control apparatus 102 may detect, based on the positions of one or more UAVs of the first plurality of UAVs 608 or the second plurality of UAVs 616, that the first virtual NC boundary 606 and the second virtual NC boundary 614 may be adjacent to each other and one or more UAVs of the first plurality of UAVs 608 or the second plurality of UAVs 616 may collide with each other. To avoid such collision situation or noise cancellation interference between both the virtual rooms, the circuitry 202 may control the positions and/or orientation of each of the first plurality of UAVs 608 and the second plurality of UAVs 616 to maintain an appropriate or minimum distance (say in certain feets, yards, or meters as represented by marker "D" shown in FIG. 6) between one or more UAVs so that both the first plurality of UAVs 608 and the second plurality of UAVs 616 provide accurate noise cancellation boundaries (or real room effect) to the first set of occupants 604 and the second set of occupants 612, respectively. In some embodiments, (rather than the control apparatus 102) one or more UAVs of the first plurality of UAVs 608 and the second plurality of UAVs 616 may be configured to determine that the first virtual room and the second virtual room are adjacent to each other, and determine the minimum distance to be maintained to create accurate noise cancellation boundaries (i.e. the first virtual NC boundary 606 and the second virtual NC boundary 614) around the physical area 602 and the other physical area 610 shown in FIG. 6. The one or more UAVs may refer respective 3D positions of each UAV of the first plurality of UAVs 608 and the second plurality of UAVs 616 or may control in-built image capturing device (such as the image capturing device 608 in FIG. 7) to detect whether the UAVs are in collision, and accordingly control the position and/or orientation of UAVs to avoid the collision and maintain minimum distance ("D" shown in FIG. 6) between the first virtual NC boundary 606 and the second virtual NC boundary 614.

Figure 7:
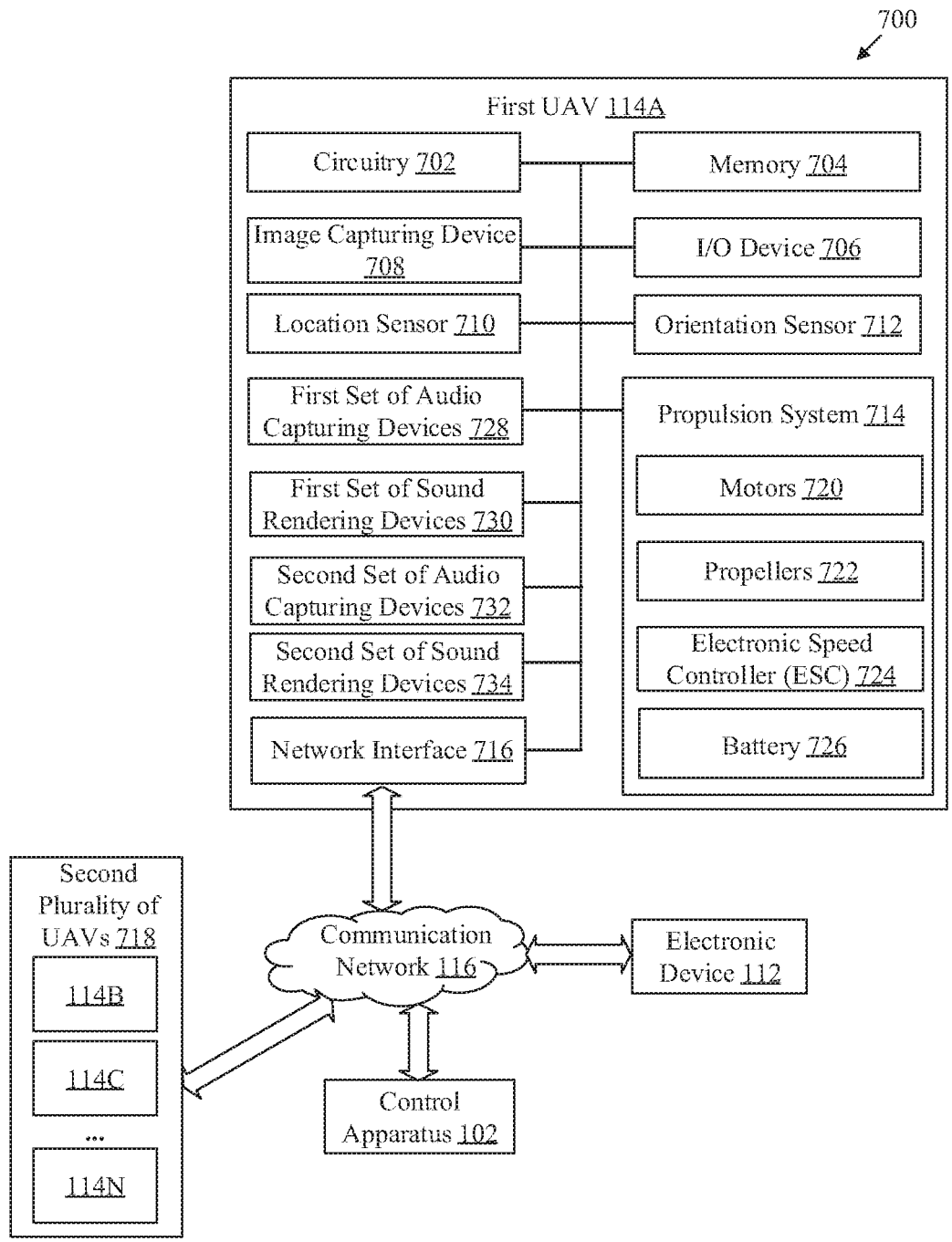
FIG. 7 is a block diagram that illustrates an exemplary unmanned aerial vehicle (UAV) for noise cancellation in physical area, in accordance with an embodiment of the disclosure.

FIG. 7 is a block diagram that illustrates an exemplary unmanned aerial vehicle (UAV) for noise cancellation in physical area, in accordance with an embodiment of the disclosure. FIG. 7 is explained in conjunction with elements from FIGS. 1, 2, 3A-3C, 4, 5, and 6. With reference to FIG. 7, there is shown a block diagram 700 of an unmanned aerial vehicle (such as the first UAV 114A or the UAV 502). The first UAV 114A may include a circuitry 702, a memory 704, an input/output (I/O) device 706, an image capturing device 708, a location sensor 710, an orientation sensor 712, a propulsion system 714, and a network interface 716. In FIG. 7, there is further shown a second plurality of UAVs 718. The second plurality of UAVs 718 may be UAVs different from the first UAV 114A. For example, the second plurality of UAVs may include the second UAV 114B, the third UAV 114C, the fourth UAV 114D, the fifth UAV 114E, the sixth UAV 114F, and the seventh UAV 114G as shown in FIGS. 3A-3C. There is further shown in FIG. 7, the control apparatus 102, the electronic device 112 associated with an occupant (for example the first occupant 110A). The first UAV 114A, the control apparatus 102, the electronic device 112, and the second plurality of UAVs 718 may be communicatively coupled to the circuitry 702, via the communication network 116 and the network interface 716.

The functions of the circuitry 702, the memory 704, the I/O device 706, the image capturing device 708, and the network interface 716 shown in the block diagram 700 of the first UAV 114A may be same as the functions of the circuitry 202, the memory 204, the I/O device 208, the image capturing device 104, and the network interface 210 as described, for example, in FIGS. 1, 2, and 3A-3C. Therefore, the description of the circuitry 702, the memory 704, the I/O device 706, the image capturing device 708, and the network interface 716 is omitted from the disclosure for the sake of brevity. As shown in FIG. 7, the first UAV 114A may include the image capturing device 104 (for example camera) to capture images of the second physical area 108, the first occupant 110A, and the first physical area 106.

In FIG. 7, there is further shown, a first set of audio capturing devices 728, a first set of sound rendering devices 730, a second set of audio capturing devices 732, and a second set of sound rendering devices 734. The first UAV 114A may include the first set of audio capturing devices 728 which may be disposed on an outer portion of the first UAV 114A and include the first set of sound rendering devices 730 which may be disposed on an inner portion of the first UAV 114A. The first UAV 114A may further include the second set of audio capturing devices 732 disposed on the inner portion of the first UAV 114A and include the second set of sound rendering devices 734 disposed on the outer portion of the first UAV 114A. The functions of the first set of audio capturing devices 728, the first set of sound rendering devices 730, the second set of audio capturing devices 732, and the second set of sound rendering devices 734 shown in the block diagram 700 of the first UAV 114A may be same as the functions of the first set of audio capturing devices 118, the first set of sound rendering devices 120, the second set of audio capturing devices 318, and the second set of sound rendering devices 320 described, for example, in FIGS. 1 and 3A-3C.

The location sensor 710 may include suitable logic, circuitry, interfaces, and/or code that may be configured to determine a current geo-location of the first UAV 114A. The location sensor 710 may be further configured to determine the physical 3D position (XYZ position) of the first UAV 114A with respect to the second physical area 108. The location sensor 710 may be configured to communicate the current geo-location and the 3D position to the circuitry 702 of the first UAV 114A and the control apparatus 102. Examples of the location sensor 710, may include, but are not limited to, a Global Navigation Satellite System (GNSS)-based sensor. Examples of the GNSS-based sensor may include, but are not limited to, global positioning sensor (GPS), Global Navigation Satellite System (GLONASS), or other regional navigation systems or sensors.

The orientation sensor 712 may include suitable logic, circuitry, interfaces, and/or code that may be configured to detect current orientation of the first UAV 114A and provide the detect current orientation to the circuitry 702 or the control apparatus 102. The circuitry 202 of the control apparatus 102 may further provide information about updated orientation to the circuitry 702 based on the received orientation detected by the orientation sensor. The circuitry 702 may further control the orientation of the first UAV 114A based on the received the information about the updated orientation. Examples of the orientation sensor 712 may include, but are not limited to, a motion sensor, a tilt sensor, an accelerometer, or a gyro sensor.

The propulsion system 714 is a set of mechanical and electrical components that generates thrust to push the first UAV 114A upward and forward during the flight. The propulsion system 714 may control the movement of the first UAV 114A based on the one or more control instructions received from the circuitry 702 or the control apparatus 102. The propulsion system 714 may further include motors 720, propellers 722, an electronic speed controller (ESC) 724, and a battery 726.

The motors 720 may be configured to rotate the propellers 722 to move the first UAV 114A in the physical 3D space. Example of the motors 720 may include, but are not limited to, a direct-current (DC) motor, a brushless DC motor, a brushed motor, a coreless motor, or other motors relevant for the unmanned aerial vehicles. The propellers 722 may include rotor blades with a pre-specified diameter that rotate on a pre-configured speed to produce a minimum thrust for the first UAV 114A. In addition to the pre-specified diameter, the propellers 722 may be further associated with a shape, an angle of attack, a pitch, and a surface area of the rotor blades. The propellers 722 may be manufactured from different materials, such as injection-molded plastic, fiber-reinforced polymer, or natural materials (such as wood).

The ESC 724 may comprise suitable logic, circuitry, interfaces, and/or code that may be configured to control the speed and direction of the motors 720 and further control the speed and direction of movement of the first UAV 114A. The ESC 724 may be configured to receive the one or more control instructions from the control apparatus 102 or the circuitry 702 to control the speed and the direction of the first UAV 114A. The battery 726 may be a source of electric power for one or more electric circuits of the first UAV 114A. For example, the battery 726 may be a source of electrical power to the circuitry 702, the memory 704, the I/O device 706, the image capturing device 708, the location sensor 710, the orientation sensor 712, the propulsion system 714 and the network interface 716. The battery 726 may be a rechargeable battery. The battery 726 may be the source of electrical power to start or control the movement of the first UAV 114A. In some embodiments, the battery 726 may correspond to a battery pack, which may have a plurality of clusters of batteries. Examples of the battery 726 may include, but are not limited to, a lead acid battery, a nickel cadmium battery, a nickel-metal hydride battery, a lithium ion battery, and other rechargeable batteries.

It may be noted that the circuitry 702, the memory 704, the I/O device 706, the image capturing device 708, the location sensor 710, the orientation sensor 712, the propulsion system 714 and the network interface 716 shown as a part of the first UAV 114A may be included in each of the second plurality of UAVs 718. In an embodiment, the first UAV 114A may act as a master UAV and each of the second plurality of UAVs 718 may act as a slave UAV which may receive the one or more control instructions to form the virtual noise cancellation boundary 122.

A person of ordinary skill in the art will understand that the first UAV 114A may also include other suitable components or systems, in addition to the components or systems which are illustrated herein to describe and explain the function and operation of the present disclosure. A detailed description for the other components or systems of the first UAV 114A has been omitted from the disclosure for the sake of brevity.

In operation, the circuitry 702 may control the first UAV 114A to move or fly in the second physical area 108. The circuitry 702 may be configured to receive the trigger input from the electronic device 112 associated with the first occupant 110A present in the first physical area 106. The reception of the trigger input is described, for example, in FIG. 3A. In an embodiment, the circuitry 702 may control the image capturing device 708 to capture images of the second physical area 108 and identify the need to create the virtual noise cancellation boundary 122 around the first physical area 106 as described, for example, in FIG. 3A. The trigger input may include the information about the first physical area 106. Examples of the information may include, but are not limited to, exact location/position of the first physical area 106 inside the second physical area 108, a table number in a restaurant, a seat number or work station detail in an office room, a particular place (such as a landmark, a point-of-interest).

In accordance with an embodiment, the circuitry 702 may be further configured to control the image capturing device 708 to capture an image of the first physical area 106 based on the received trigger input. The circuitry 702 may further determine the number of occupants of the first set of occupants 110 present in the first physical area 106 based on the captured image. The circuitry 702 may also determine the scene information (i.e. indoor area or outdoor area) based on the captured image as described, for example, in FIG. 3A. The circuitry 702 may be further configured to determine a number of UAVs of the second plurality of UAVs 718 from the docking station 302 based on the determined number of occupants and the scene information of the first physical area 106.

In accordance with an embodiment, the circuitry 702 may control the movement of the first UAV 114A and the selected second plurality of UAVs 718 in the physical 3D space to create the virtual noise cancellation boundary 122 around the first physical area 106. In some embodiments, the circuitry 702 may only control the movement of the second plurality of UAVs 718 to create the virtual noise cancellation boundary 122. The circuitry 702 may be configured to control transmission of the one or more control instruction to each of the second plurality of UAVs 718 to control the movement in the physical 3D space, the 3D position and the orientation of each of the selected second plurality of UAVs 718 as described, for example, in FIGS. 3A-3C.

In accordance with an embodiment, a combination of the first set of audio capturing devices 728 and the first set of sound rendering devices 730 of each of the first UAV 114A and the second plurality of UAVs 718 may create the virtual noise cancellation boundary 122 for the inside area 310 of the first physical area 106 from the first noise associated with the outside area 306 as described, for example, in FIGS. 3A-3C. Similarly, a combination of the second set of audio capturing devices 732 and the second set of sound rendering devices 734 of each of the first UAV 114A and the second plurality of UAVs 718 may create the virtual noise cancellation boundary 122 for the outside area 306 from the second noise associated with the inside area 310 of the first physical area 106 as described, for example, in FIGS. 3A-3C. In accordance with an embodiment, based on the created virtual noise cancellation boundary 122, the circuitry 702 may control the first set of audio capturing devices 728 and the second set of audio capturing devices 732 to control the quality of the noise cancellation based on noise feedback and further deploy additional UAVs to update or improve the virtual noise cancellation boundary 122 around the first physical area 106 as described, for example, in FIG. 3C.

Figure 8:
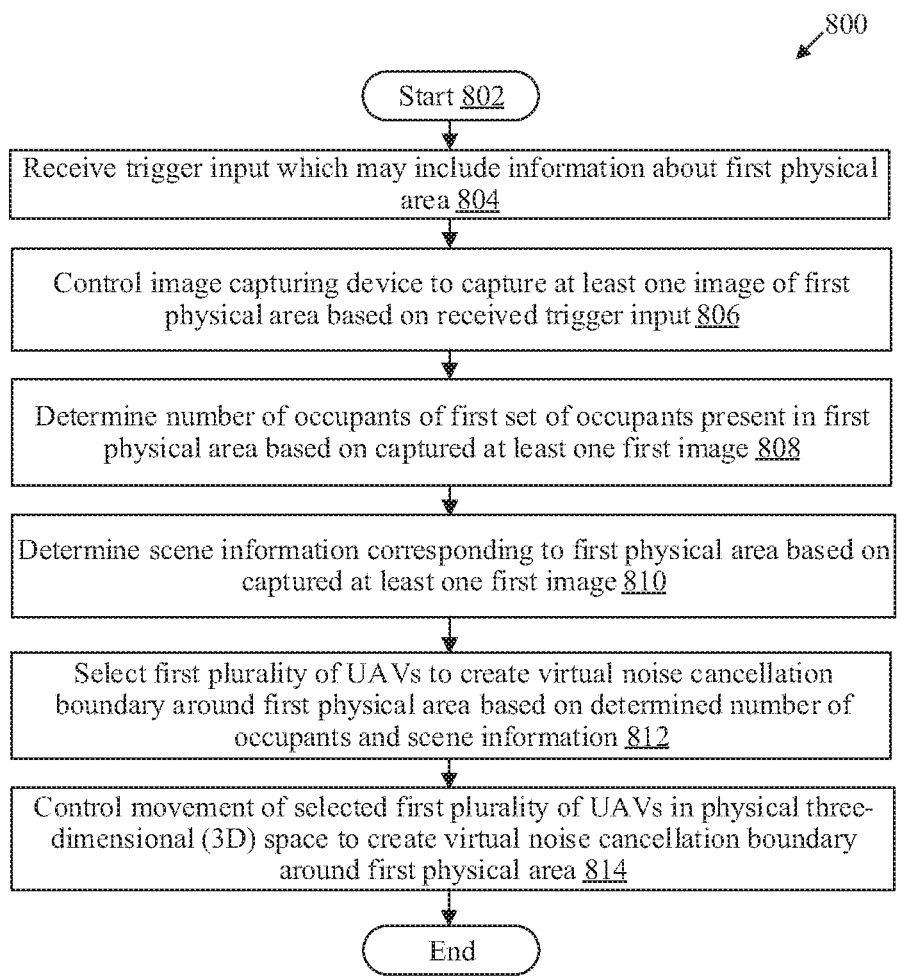
FIG. 8 is a flowchart that illustrates exemplary operations for noise cancellation in physical area based on unmanned aerial vehicle (UAV), in accordance with an embodiment of the disclosure.

FIG. 8 is a flowchart that illustrates exemplary operations for noise cancellation in physical area based on unmanned aerial vehicle (UAV), in accordance with an embodiment of the disclosure. FIG. 8 is explained in conjunction with elements from FIGS. 1, 2, 3A, 3B, 3C, 4, 5, 6, and 7. With reference to FIG. 8, there is shown a flowchart 800. The operations from 802 to 812 may be implemented on the control apparatus 102, the circuitry 202 or the circuitry 702 of the first UAV 114A. The operations may start at 802 and proceed to 804.

At 804, the trigger input which may include the information about the first physical area 106 may be received. In accordance with an embodiment, the circuitry 202 or the circuitry 702 may be configured to receive the trigger input which may include the information about the first physical area 106. The trigger input may be received from the electronic device 112, the image capturing device 104, or one of the plurality of image capturing devices 212 as descried in detail, for example, in FIGS. 3A-3C.

At 806, the image capturing device 104 may be controlled to capture at least one image of the first physical area 106 based on the received trigger input. In accordance with an embodiment, the circuitry 202 may be configured to control the image capturing device 104 to capture the at least one image of the first physical area 106 based on the received trigger input as descried in detail, for example, in FIGS. 3A-3C. The circuitry 702 of the first UAV 114A may control the image capturing device 708 to capture the at least one image of the first physical area 106 as described, for example, in FIG. 7.

At 808, the number of occupants of the first set of occupants 110 present in the first physical area 106 may be determined based on the captured at least one first image. In accordance with an embodiment, the circuitry 202 or the circuitry 702 may be configured to determine the number of occupants of the first set of occupants 110 present in the first physical area 106 as described, for example, in FIGS. 3A-3C and FIG. 7.

At 810, the scene information corresponding to the first physical area 106 may be determined based on the captured at least one first image. In accordance with an embodiment, the circuitry 202 or the circuitry 702 may be configured to determine the scene information corresponding to the first physical area 106. The scene information may indicate whether the first physical area 106 may be an indoor area (for example an office, a home, a restaurant, or the like) or an outdoor area (for example a playground, a terrace, or the like) as described, for example, in FIGS. 3A-3C.

At 812, the first plurality of UAVs 114 may be selected to create a virtual noise cancellation boundary 122 around the first physical area 106 based on the determined number of occupants and the scene information. In accordance with an embodiment, the circuitry 202 or the circuitry 702 may be configured to select the first plurality of UAVs 114 from the plurality of UAVs 304 in the docking station 302 based on the determined number of occupants and the scene information of the first physical area 106 as described, for example, in FIGS. 3A-3C.

At 814, the movement of the selected first plurality of UAVs 114 may be controlled in the physical three-dimensional (3D) space to create the virtual noise cancellation boundary 122 around the first physical area 106. In accordance with an embodiment, the circuitry 202 or the circuitry 702 may be configured to control the movement of the selected first plurality of UAVs 114 (or the second plurality of UAVs 718) to create the virtual noise cancellation boundary 122 around the first physical area 106 as described, for example, in FIGS. 3A-3C and FIG. 7. Control passes to an end.

It may be noted that the flowchart 800 is illustrated as discrete operations, such as 802, 804, 806, 808, 810, 812, and 814. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate a control apparatus 102. The instructions may cause the machine and/or computer to perform operations which include reception of a trigger input which may include information about a first physical area (such as the first physical area 106). Further, an image capturing device (such as the image capturing device 104) may be controlled to capture at least one first image of the first physical area based on the received trigger input. Further, a number of occupants in a first set of occupants (such as the first set of occupants 110) present in the first physical area and scene information corresponding to the first physical area may be determined based on the captured at least one first image. Further, a movement of a first plurality of unmanned aerial vehicles (UAVs) (such as the first plurality of UAVs 114) may be controlled in a physical three-dimensional (3D) space to create a virtual noise cancellation boundary (such the virtual noise cancellation boundary 122) around the first physical area based on the determined number of occupants in the first set of occupants and the scene information.

Exemplary aspects of the disclosure may include a control apparatus (such as the control apparatus 102) which may include circuitry (such as the circuitry 202). The circuitry 202 may be configured to receive a trigger input which includes information about a first physical area (such as the first physical area 106). The circuitry 202 may be further configured to control an image capturing device (such as the image capturing device 104) to capture at least one first image of the first physical area 106 based on the received trigger input. The circuitry 202 may be further configured to determine a number of occupants of a first set of occupants (such as the first set of occupants 110 present in the first physical area 106 and scene information corresponding to the first physical area 106 based on the captured at least one first image. The circuitry 202 may be further configured to control a movement of a first plurality of unmanned aerial vehicles (UAVs) (such as the first plurality of UAVs 114) in a physical three-dimensional (3D) space to create a virtual noise cancellation boundary (such as the virtual noise cancellation boundary 122) around the first physical area 106 based on the determined number of occupants of the first set of occupants 110 and the scene information.

In accordance with an embodiment, the circuitry 202 may be further configured to receive the trigger input from an electronic device (such as the electronic device 112) associated with a first occupant (such as the first occupant 110A) of the first set of occupants 110. The trigger input received from the electronic device 112 may include the number of occupants of the first set of occupants 110 and the scene information. The circuitry 202 may be further configured to extract the number of occupants of the first set of occupants 110 and the scene information from the received trigger input to control the movement of the first plurality of UAVs 114. The scene information may indicate that the first physical area 106 is an indoor area or an outdoor area.

In accordance with an embodiment, the circuitry 202 may be further configured to determine a number of UAVs in the first plurality of UAVs 114 based on the number of occupants of the first set of occupants 110 present in the first physical area 106 and the scene information corresponding to the first physical area 106. The circuitry 202 may be further configured to determine a size of the first physical area 106 based on the captured at least one first image and determine a number of UAVs in the first plurality of UAVs 114 based on the determined size, the number of occupants of the first set of occupants 110 present in the first physical area 106, and the scene information corresponding to the first physical area 106.

In accordance with an embodiment, the circuitry 202 may be further configured to determine a context of meeting based on the number of occupants of the first set of occupants 110, the scene information, one or more objects present in the first physical area 106. The one or more objects may be associated with at least one occupant of the first set of occupants 110. The circuitry 202 may be further configured to determine a number of UAVs in the first plurality of UAVs 114 based on the determined context of meeting.

In accordance with an embodiment, the circuitry 202 may be further configured to recognize one or more occupants of the first set of occupants 110 present in the first physical area 106. The circuitry 202 may be further configured to determine a context of meeting based on profile information associated with the recognized one or more occupants. The circuitry 202 may be further configured to determine a number of UAVs in the first plurality of UAVs 114 based on the determined context of meeting.

In accordance with an embodiment, the circuitry 202 may be further configured to detect a presence of a second set of occupants, different from the first set of occupants 110, in the first physical area 106. The circuitry 202 may be further configured to determine a number of UAVs in a second plurality of UAVs based on the detected presence of the second set of occupants in the first physical area 106 and control a movement of the first plurality of UAVs 114 and the second plurality of UAVs in the physical 3D space to create the virtual noise cancellation boundary 122 around the first physical area 106.

In accordance with an embodiment, the circuitry 202 may be further configured to control plurality of image capturing devices (such as the plurality of image capturing devices 212) to capture a second plurality of images of a second physical space (such as the second physical area 108) over a period of time, wherein the second physical area 108 includes the first physical area 106. The circuitry 202 may be further configured to receive the trigger input from one of the plurality image capturing devices 212 based on the captured second plurality of images. In accordance with an embodiment, the circuitry 202 may be further configured to select the image capturing device 104 from a plurality of image capturing devices. The first physical area 106 is included in a field-of-view (FOV) of the selected image capturing device 104.

In accordance with an embodiment, to control the movement of the first plurality of UAVs 114, the circuitry 202 may be further configured to control at least one of X-axis movement, Y-axis movement, Z-axis movement, or an orientation of the first plurality of UAVs 114. In accordance with an embodiment, the circuitry 202 may be further configured to recognize a source of a first noise inside or outside the first physical area 106 and determine a level of the first noise inside or outside the first physical area 106. The circuitry 202 may be further configured to determine a number of UAVs in the first plurality of UAVs 114, a 3D position of each of the first plurality of UAVs 114, and an orientation of each of the first plurality of UAVs 114 based on the recognized source and the level of the first noise.

In accordance with an embodiment, the control apparatus 102 may further include a learning engine (such as the learning engine 206) which may be configured to learn the number of UAVs in the first plurality of UAVs 114, the 3D position, and the orientation of each of the first plurality of UAVs 114 based on at least one of the recognized source of the first noise, the level of the first noise, the number of occupants of the first set of occupants 110, the scene information, or a context of meeting associated with the first set of occupants 110.

Exemplary aspects of the disclosure may also include a first unmanned aerial vehicle (UAV) (such as the first UAV 114A) which may include an image capturing device (such as the image capturing device 708) and circuitry (such as the circuitry 702). The circuitry 702 may be configured to receive a trigger input which may include information about a first physical area (such as the first physical area 106). The circuitry 702 may be further configured to control the image capturing device 708 to capture at least one first image of the first physical area 106 based on the received trigger input. The circuitry 702 may be further configured to determine a number of occupants of a first set of occupants (such as the first set of occupants 110) present in the first physical area 106 and scene information corresponding to the first physical area 106 based on the captured at least one first image. The circuitry 702 may be further configured to control a movement of a second plurality of UAVs (such as the second plurality of UAVs 718) and the first UAV 114A in a physical three-dimensional (3D) space to create a virtual noise cancellation boundary 122 around the first physical area 106 based on the determined number of occupants of the first set of occupants 110 and the scene information.

In accordance with an embodiment, the circuitry 702 may be further configured to transmit control instructions to each of the second plurality of UAVs 718 to further control a 3D position in the physical 3D space and an orientation of each of the second plurality of UAVs 718. In accordance with an embodiment, the each of the first UAV 114A and the second plurality of UAVs 718 may include a first set of audio capturing devices (such as the first set of audio capturing devices 118) disposed on an outer portion of each of the first UAV 114A and the second plurality of UAVs 718. Each of the first UAV 114A and the second plurality of UAVs 718 may further include a first set of sound rendering devices 120 disposed on an inner portion of each of the first UAV 114A and the second plurality of UAVs 718. Each of the first UAV 114A and the second plurality of UAVs 718 may further include a second set of audio capturing devices (such as the second set of audio capturing devices 318) disposed on the inner portion of each of the first UAV 114A and the second plurality of UAVs 718. Each of the first UAV 114A and the second plurality of UAVs 718 may further include a second set of sound rendering devices (such as the second set of sound rendering devices 320) disposed on the outer portion of each of the first UAV 114A and the second plurality of UAVs 718.

In accordance with an embodiment, the first set of sound rendering devices 120 may reproduce a first sound wave which is out-of-phase signal of a first audio signal captured by the first set of audio capturing devices 118. The second set of sound rendering devices 320 may reproduce a second sound wave which is out-of-phase of a second audio signal captured by the second set of audio capturing devices 318. In accordance with an embodiment, a first combination of the first set of audio capturing devices 180 and the first set of sound rendering devices 120 of each of the first UAV 114A and the second plurality of UAVs 718 may create the virtual noise cancellation boundary 122 for an inside area of the first physical area 106 from a first noise associated with an outside area of the first physical area 106. A second combination of the second set of audio capturing devices 318 and the second set of sound rendering devices 320 of each of the first UAV 114A and the second plurality of UAVs 718 may create the virtual noise cancellation boundary 122 for the outside area of the first physical area 106 from a second noise associated with the inside area of the first physical area 106.

In accordance with an embodiment, based on the created virtual noise cancellation boundary 122 around the first physical area 106, the circuitry 702 may be further configured to determine a first noise in an outside area of the first physical area 106 and a second noise in an inside area of the first physical area 106 through the first set of audio capturing devices 118 and the second set of audio capturing devices 318 respectively. The circuitry 702 may be further configured to determine a number of UAVs in a third plurality of UAVs (such as the third plurality of UAVs) based on the determined first noise in the outside area and the second noise in the inside area of the first physical area 106 and control a movement of the first UAV 114A, the second plurality of UAVs 718, and the third plurality of UAVs in the physical 3D space to update the virtual noise cancellation boundary 122 around the first physical area 106.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A control apparatus, comprising:
    circuitry configured to:
        receive a trigger input which includes information about a first physical area;
        control an image capturing device to capture at least one first image of the first physical area based on the received trigger input;
        determine a number of occupants of a first set of occupants present in the first physical area and scene information corresponding to the first physical area based on the captured at least one first image; and
        control a movement of a first plurality of unmanned aerial vehicles (UAVs) in a physical three-dimensional (3D) space to create a virtual noise cancellation boundary around the first physical area based on the determined number of occupants of the first set of occupants and the scene information.

2. The control apparatus according to claim 1, wherein the circuitry is further configured to receive the trigger input from an electronic device associated with a first occupant of the first set of occupants.

3. The control apparatus according to claim 2,
    wherein the trigger input received from the electronic device includes the number of occupants of the first set of occupants and the scene information, and
    wherein the circuitry is further configured to extract the number of occupants of the first set of occupants and the scene information from the received trigger input to control the movement of the first plurality of UAVs.

4. The control apparatus according to claim 1, wherein the scene information indicate that the first physical area is an indoor area or an outdoor area.

5. The control apparatus according to claim 1, wherein the circuitry is further configured to determine a number of UAVs in the first plurality of UAVs based on the number of occupants of the first set of occupants present in the first physical area and the scene information corresponding to the first physical area.

6. The control apparatus according to claim 1, wherein the circuitry is further configured to:
   determine a size of the first physical area based on the captured at least one first image; and
   determine a number of UAVs in the first plurality of UAVs based on the determined size, the number of occupants of the first set of occupants present in the first physical area, and the scene information corresponding to the first physical area.

7. The control apparatus according to claim 1, wherein the circuitry is further configured to:
   determine a context of meeting based on one of the number of occupants of the first set of occupants, the scene information, or one or more objects present in the first physical area, wherein the one or more objects are associated with at least one occupant of the first set of occupants; and
   determine a number of UAVs in the first plurality of UAVs based on the determined context of meeting.

8. The control apparatus according to claim 1, wherein the circuitry is further configured to:
   recognize one or more occupants of the first set of occupants present in the first physical area;
   determine a context of meeting based on profile information associated with the recognized one or more occupants; and
   determine a number of UAVs in the first plurality of UAVs based on the determined context of meeting.

9. The control apparatus according to claim 1, wherein the circuitry is further configured to:
   detect a presence of a second set of occupants, different from the first set of occupants, in the first physical area;
   determine a number of UAVs in a second plurality of UAVs based on the detected presence of the second set of occupants in the first physical area; and
   control a movement of the first plurality of UAVs and the second plurality of UAVs in the physical 3D space to create the virtual noise cancellation boundary around the first physical area.

10. The control apparatus according to claim 1, wherein the circuitry is further configured to:
    control a plurality of image capturing devices to capture a second plurality of images of a second physical space over a period of time, wherein the second physical space includes a first physical space; and
    receive the trigger input from one of the plurality of image capturing devices based on the captured second plurality of images.

11. The control apparatus according to claim 1, wherein the circuitry is further configured to select the image capturing device from a plurality of image capturing devices, and wherein the first physical area is included in a field-of-view (FOV) of the selected image capturing device.

12. The control apparatus according to claim 1, wherein to control the movement of the first plurality of UAVs, the circuitry is further configured to control at least one of X-axis movement, Y-axis movement, Z-axis movement, or an orientation of the first plurality of UAVs.

13. The control apparatus according to claim 1, wherein the circuitry is further configured to:
    recognize a source of a first noise inside or outside the first physical area;
    determine a level of the first noise inside or outside the first physical area; and
    determine a number of UAVs in the first plurality of UAVs, a 3D position of each of the first plurality of UAVs, and an orientation of each of the first plurality of UAVs based on the recognized source and the level of the first noise.

14. The circuitry according to claim 13, further comprising a learning engine which is configured to learn the number of UAVs in the first plurality of UAVs, the 3D position, and the orientation of each of the first plurality of UAVs based on at least one of the recognized source of the first noise, the level of the first noise, the number of occupants of the first set of occupants, the scene information, or a context of meeting associated with the first set of occupants.

15. A first unmanned aerial vehicle (UAV), comprising:
    an image capturing device; and
    circuitry configured to:
      receive a trigger input which includes information about a first physical area;
      control the image capturing device to capture at least one first image of the first physical area based on the received trigger input;
      determine a number of occupants of a first set of occupants present in the first physical area and scene information corresponding to the first physical area based on the captured at least one first image; and
      control a movement of a second plurality of UAVs and the first UAV in a physical three-dimensional (3D) space to create a virtual noise cancellation boundary around the first physical area based on the determined number of occupants of the first set of occupants and the scene information.

16. The first UAV according to claim 15, wherein the circuitry is further configured to transmit control instructions to each of the second plurality of UAVs to further control a 3D position in the physical 3D space and an orientation of each of the second plurality of UAVs.

17. The first UAV according to claim 15, wherein each of the first UAV and the second plurality of UAVs includes:
    a first set of audio capturing devices disposed on an outer portion of each of the first UAV and the second plurality of UAVs;
    a first set of sound rendering devices disposed on an inner portion of each of the first UAV and the second plurality of UAVs;
    a second set of audio capturing devices disposed on the inner portion of each of the first UAV and the second plurality of UAVs, and
    a second set of sound rendering devices disposed on the outer portion of each of the first UAV and the second plurality of UAVs.

18. The first UAV according to claim 17,
    wherein the first set of sound rendering devices reproduce a first sound wave which is out-of-phase signal of a first audio signal captured by the first set of audio capturing devices; and
    wherein the second set of sound rendering devices reproduce a second sound wave which is out-of-phase of a second audio signal captured by the second set of audio capturing devices.

19. The first UAV according to claim 17,
    wherein a first combination of the first set of audio capturing devices and the first set of sound rendering devices of each of the first UAV and the second plurality of UAVs creates the virtual noise cancellation boundary for an inside area of the first physical area from a first noise associated with an outside area of the first physical area; and wherein a second combination of the second set of audio capturing devices and the second set of sound rendering devices of each of the first UAV and the second plurality of UAVs creates the virtual noise cancellation boundary for the outside area of the first physical area from a second noise associated with the inside area of the first physical area.

20. The first UAV according to claim 17, wherein, based on the created virtual noise cancellation boundary around the first physical area, the circuitry is further configured to:

determine a first noise in an outside area of the first physical area and a second noise in an inside area of the first physical area through the first set of audio capturing devices and the second set of audio capturing devices respectively;

determine a number of UAVs in a third plurality of UAVs based on the determined first noise in the outside area and the second noise in the inside area of the first physical area; and control a movement of the first UAV, the second plurality of UAVs, and the third plurality of UAVs in the physical 3D space to update the virtual noise cancellation boundary around the first physical area.

21. A method, comprising:

in a control apparatus:

receiving a trigger input which includes information about a first physical area;

controlling an image capturing device to capture at least one first image of the first physical area based on the received trigger input;

determining a number of occupants of a first set of occupants present in the first physical area and scene information corresponding to the first physical area based on the captured at least one first image; and controlling a movement of a first plurality of unmanned aerial vehicles (UAVs) in a physical three-dimensional (3D) space to create a virtual noise cancellation boundary around the first physical area based on the determined number of occupants of the first set of occupants and the scene information.

* * * * *